(12) United States Patent
Mizusawa

(10) Patent No.: US 7,599,771 B2
(45) Date of Patent: Oct. 6, 2009

(54) PARKING ASSISTING APPARATUS

(75) Inventor: Kazufumi Mizusawa, Kadoma (JP)

(73) Assignee: Panasonic Corporation, Osaka (JP)

( * ) Notice: Subject to any disclaimer, the term of this patent is extended or adjusted under 35 U.S.C. 154(b) by 575 days.

(21) Appl. No.: 10/580,791

(22) PCT Filed: Apr. 27, 2005

(86) PCT No.: PCT/JP2005/007988

§ 371 (c)(1),
(2), (4) Date: May 26, 2006

(87) PCT Pub. No.: WO2005/108171

PCT Pub. Date: Nov. 17, 2005

(65) Prior Publication Data

US 2007/0112490 A1 May 17, 2007

(30) Foreign Application Priority Data

May 6, 2004 (JP) .............................. 2004-137651

(51) Int. Cl.
G06F 7/00 (2006.01)
(52) U.S. Cl. ................. 701/36; 701/1; 701/41; 318/567; 318/568.1; 318/568.25; 318/580
(58) Field of Classification Search ............... 701/36, 701/41, 1
See application file for complete search history.

(56) References Cited

U.S. PATENT DOCUMENTS 4,931,930 A * 6/1990 Shyu et al. .................... 701/36

6,061,002 A * 5/2000 Weber et al. .............. 340/932.2
6,097,314 A * 8/2000 Desens et al. ............. 340/932.2

(Continued)

FOREIGN PATENT DOCUMENTS

JP 4-160608 6/1992

(Continued)

*Primary Examiner*—Khoi Tran
*Assistant Examiner*—Jonathan Sample
(74) *Attorney, Agent, or Firm*—Pearne & Gordon LLP

(57) ABSTRACT

It is an object of the present invention to provide a parking assisting apparatus for assisting a vehicle driver in parking a vehicle more easily than the conventional apparatuses. The parking assisting apparatus comprises an image pickup unit for picking up the image of the area behind a vehicle (80), display means for displaying the image picked up by the image pickup means; and image processing means for having the display means display a parking assisting guide for assisting a vehicle driver in parking the vehicle (80) superposed on the image picked up by the image pickup means; and in which the parking assisting guide includes a steering start marker (31) for notifying the vehicle driver of start of steering of the vehicle (80); the steering start marker (31) is constituted by an intersection of tangential lines (33, 34) respectively tangent to a predetermined track (32) at two different points; the predetermined track (32) is a track expected to be drawn by a predetermined fixed point (35) fixed with respect to the vehicle (80) while the vehicle (80) is driven backwardly at a maximum steering angle, and the fixed point (35) is located on a side opposite to a center (36) of a rotation of the vehicle (80) around which the vehicle (80) is expected to rotate while the vehicle (80) is driven backwardly at a maximum steering angle, with respect to the vehicle (80).

7 Claims, 25 Drawing Sheets

U.S. PATENT DOCUMENTS

| | | | |
|---|---|---|---|
| 6,344,805 B1* | 2/2002 | Yasui et al. | 340/932.2 |
| 6,487,481 B2* | 11/2002 | Tanaka et al. | 701/41 |
| 6,611,744 B1* | 8/2003 | Shimazaki et al. | 701/41 |
| 6,654,670 B2* | 11/2003 | Kakinami et al. | 701/1 |
| 7,295,227 B1* | 11/2007 | Asahi et al. | 348/118 |
| 2002/0041239 A1* | 4/2002 | Shimizu et al. | 340/932.2 |
| 2002/0104700 A1* | 8/2002 | Shimazaki et al. | 180/204 |
| 2002/0128750 A1* | 9/2002 | Kakinami et al. | 701/1 |
| 2002/0128754 A1* | 9/2002 | Sakiyama et al. | 701/1 |
| 2002/0175832 A1* | 11/2002 | Mizusawa et al. | 340/932.2 |
| 2003/0030724 A1* | 2/2003 | Okamoto | 348/148 |
| 2003/0045973 A1* | 3/2003 | Okamoto | 701/1 |
| 2004/0153243 A1* | 8/2004 | Shimazaki et al. | 701/300 |
| 2004/0204807 A1* | 10/2004 | Kimura et al. | 701/36 |
| 2004/0260439 A1* | 12/2004 | Endo et al. | 701/36 |
| 2005/0273236 A1* | 12/2005 | Mori et al. | 701/41 |

FOREIGN PATENT DOCUMENTS

| | | |
|---|---|---|
| JP | 11-334470 | 12/1999 |
| JP | 2000-78566 | 3/2000 |
| JP | 2000-335342 | 12/2000 |
| JP | 2001-55099 | 2/2001 |
| JP | 2003-11762 | 1/2003 |
| JP | 2003-205806 | 7/2003 |

* cited by examiner

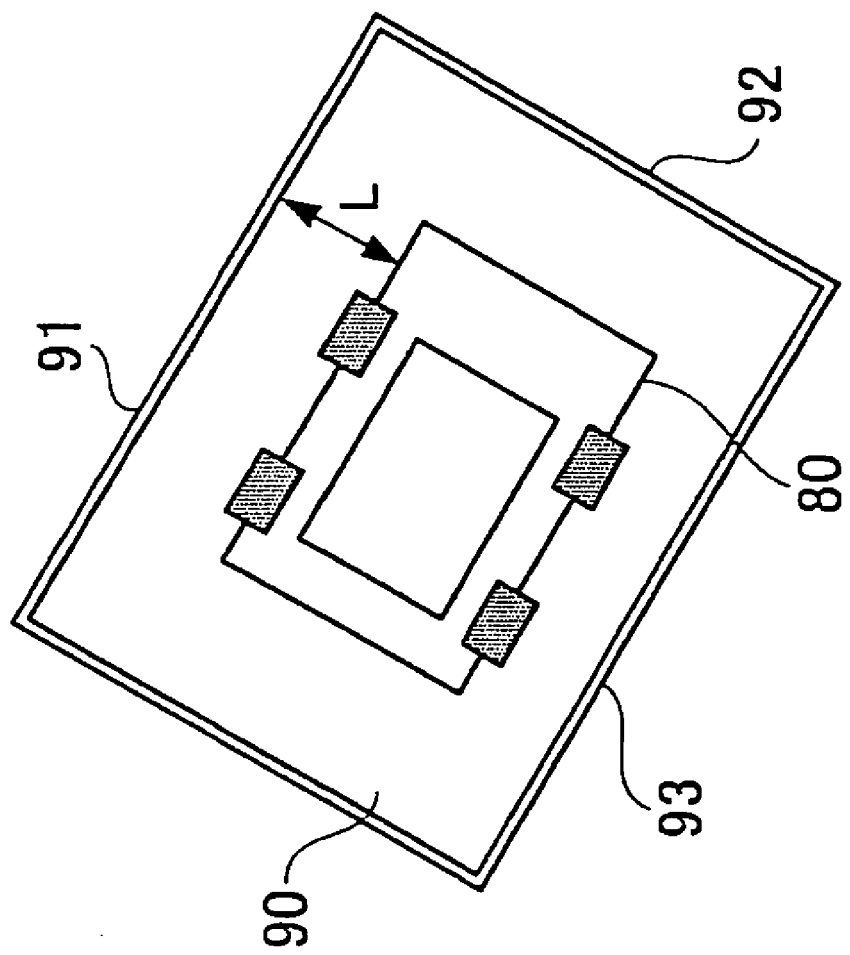

PARKING ASSISTING APPARATUS

TECHNICAL FIELD OF THE INVENTION

The present invention relates to a parking assisting apparatus for displaying a parking assisting guide for assisting a vehicle driver in parking a vehicle superposed on an image indicative of an area behind the vehicle.

DESCRIPTION OF THE RELATED ART

As one of parking assisting apparatuses described in the above, there is known a parking assisting apparatus for displaying two guide signs, which collectively serve as a parking assisting guide, superposed on an image indicative of an area behind a vehicle wherein the guide signs cross each other substantially at a right angle, and extend toward directions respectively angled at angle of approximately 45 degree with respect to a driving direction of the vehicle (see, for example, Patent Document 1).
Patent Document 1: Japanese Patent Laid-Open Publication 2003-11762 (pages 7 to 8, FIGS. 6 and 7)

DISCLOSURE OF THE INVENTION

Problems to be Solved

The conventional parking assisting apparatus, however, encounters a drawback in the fact that the conventional parking assisting apparatus cannot assist the vehicle driver in parking the vehicle properly unless the vehicle is located substantially in a perpendicular relationship to a parking place at the time point when the vehicle driver starts parking the vehicle.

The present invention is made to solve the foregoing problem, and it is therefore an object of the present invention to provide a parking assisting apparatus, which can assist a vehicle driver in parking a vehicle more easily than the conventional apparatuses.

Means of Solving the Problems

According to a first aspect of the present invention, there is provided a parking assisting apparatus, comprising: image pickup means for picking up an image of an area behind a vehicle; display means for displaying the image picked up by the image pickup means; and image processing means for having the display means display a parking assisting guide for assisting a vehicle driver in parking the vehicle superposed on the image picked up by the image pickup means; and in which the parking assisting guide includes a steering start marker for notifying the vehicle driver of start of steering of the vehicle; the steering start marker is constituted by an intersection of tangential lines respectively tangent to a predetermined track at two different points; the predetermined track is a track expected to be drawn by a predetermined fixed point fixed with respect to the vehicle while the vehicle is driven backwardly at a maximum steering angle, and the fixed point is located on a side opposite to a center of a rotation of the vehicle while the vehicle is driven backwardly at a maximum steering angle, with respect to the vehicle.

In accordance with this construction, the parking assisting apparatus according to the present invention makes it easier for a vehicle driver to park the vehicle even though the vehicle may not be located substantially in perpendicular relationship with the parking place at the time point when the vehicle driver starts parking the vehicle, resulting from the fact that the parking assisting apparatus can let the vehicle driver know when to start to turn the steering wheal of the vehicle with the steering start marker.

Further, in the parking assisting apparatus according to the present invention, the parking assisting guide may include a current steering angle track expected to be drawn by the predetermined fixed point while the vehicle is driven backwardly at a current steering angle.

In accordance with this construction, the parking assisting apparatus according to the present invention makes it easier for the vehicle driver to park the vehicle, resulting from the fact that the parking assisting apparatus can let the vehicle driver know the optimum steering angle to have the vehicle parked in the parking place 90 with the current steering angle track.

Further, in the parking assisting apparatus according to the present invention, the parking assisting guide may include a fixed guide fixed with respect to the steering start marker, and the fixed guide may includes at least one of the predetermined track and the tangential lines.

In accordance with this construction, the parking assisting apparatus according to the present invention makes it easier for the vehicle driver to park the vehicle, resulting from the fact that the parking assisting apparatus can assist the vehicle driver in parking the vehicle with the fixed guide, in addition to the steering start marker.

Further, in the parking assisting apparatus according to the present invention, the fixed guide may include at least one of the tangential lines respectively tangent at the two different points, and displayed as being integral with the steering start marker.

In accordance with this construction, the parking assisting apparatus according to the present invention makes it easier for the vehicle driver to recognize the steering start marker and the fixed guide as one parking assisting guide in comparison with the case that the steering start marker and the fixed guide are separately displayed.

Further, in the parking assisting apparatus according to the present invention, the tangential lines tangent at the two different points may be angled substantially at angles of 45 and 90 degrees with respect to the predetermined track expected to be drawn by the predetermined fixed point fixed with respect to the vehicle while the vehicle is driven backwardly at a maximum steering angle.

In accordance with this construction, the parking assisting apparatus according to the present invention makes it easier for the vehicle driver to park the vehicle, resulting from the fact that the parking assisting apparatus can let the vehicle driver know when to start to turn the steering wheal of the vehicle with the steering start marker even though the vehicle is under the condition that the vehicle is inclined with respect to a parking place at an angle equal to or greater than 45 degree, and the vehicle drive can hardly predict a path followed by the vehicle in comparison with the case that the vehicle is inclined with respect to the parking place at an angle equal to or greater than zero degree but smaller than 45 degree.

According to a second aspect of the present invention, there is provided a parking assisting method, comprising the steps of: an image pickup step of picking up an image of an area behind a vehicle; a display step of displaying the image picked up in the image pickup step; and an image processing step of having the display step display a parking assisting guide for assisting a vehicle driver in parking the vehicle superposed on the image picked up in the image pickup step; and in which the parking assisting guide includes a steering start marker for notifying the vehicle driver of start of steering of the vehicle; the steering start marker is constituted by an intersection of tangential lines respectively tangent to a predetermined track at two different points; the predetermined track is a track expected to be drawn by a predetermined fixed point fixed with respect to the vehicle while the vehicle is driven backwardly at a maximum steering angle, and the fixed point is located on a side opposite to a center of a rotation of the vehicle while the vehicle is driven backwardly at a maximum steering angle with respect to the vehicle.

In accordance with this construction, the parking assisting method according to the present invention makes it easier for a vehicle driver to park the vehicle even though the vehicle may not be located substantially in perpendicular relationship with the parking place at the time point when the vehicle driver starts parking the vehicle, resulting from the fact that the parking assisting apparatus can let the vehicle driver know when to start to turn the steering wheal of the vehicle with the steering start marker.

Further, in the parking assisting apparatus according to the present invention, the fixed point may be constituted by a point on a line collinearly extending from a rear wheel axis forming part of the vehicle, and located at a side portion forming part of the vehicle opposite to and spaced apart at a maximum distance from the center of the rotation of the vehicle with respect to the vehicle while the vehicle is driven backwardly at a maximum steering angle, with respect to the vehicle, and a distance between the predetermined track and the steering start marker may be determined to the degree that the rearmost side portion forming part of the vehicle, which is located on a side opposite to the center of a rotation of the vehicle while the vehicle is driven backwardly at the maximum steering angle, with respect to the vehicle, is spaced apart at a predetermined distance from a remoter boundary line of a parking place.

In accordance with this construction, the parking assisting apparatus according to the present invention can effectively assist the vehicle driver in parking the vehicle even though the vehicle may be a large-size vehicle and the parking place may have a small space.

Effect of the Invention

In accordance with the present invention, there is provided a parking assisting apparatus, which can assist a vehicle driver in parking a vehicle more easily than the conventional apparatuses.

BRIEF DESCRIPTION OF THE DRAWINGS

FIG. 1O is a view similar to FIG. 9 explaining the parking assisting method carried out by the parking assisting apparatus shown in FIG. 1 but showing that the vehicle is further driven.

FIG. 25 is a view showing a relationship between the vehicle and the parking place when the vehicle driver finished parking the vehicle.

EXPLANATION OF THE REFERENCE NUMERALS

10 Parking assisting apparatus
11 Image pickup device (image pickup means)
12 Display device (display means)
20 Image processing device (image processing means)
31 Steering start marker (parking assisting guide)
32 Track (predetermined track)
33 Tangential line (parking assisting guide)
34 Tangential line
35 Fixed point
36 Center of rotation
38 Track
80 Vehicle
110 Parking assisting apparatus
120 Image processing device (image processing means)
131 Current steering angle track (parking assisting guide)
T Left side rearmost portion of the vehicle

DESCRIPTION OF THE PREFERRED EMBODIMENTS

The following description will be directed to a plurality of preferred embodiments according to the present invention with reference to the drawings.

It is to be noted that movements of. a vehicle will be described using Ackerman's model in the following embodiments, It is to be further noted that the vehicle is assumed to be parked in a parking place located in a right rear direction of the vehicle. The operations of the parking assisting apparatus in the case that the vehicle is parked in a parking place located in a left rear direction of the vehicle is entirely the same as those in the case that the vehicle is parked in the parking place located in the left rear direction of the vehicle, and thus will not be described to avoid tedious repetition.

First Preferred Embodiment

The construction of the present embodiment of the parking assisting apparatus will be described hereinlater.

Figure 1:
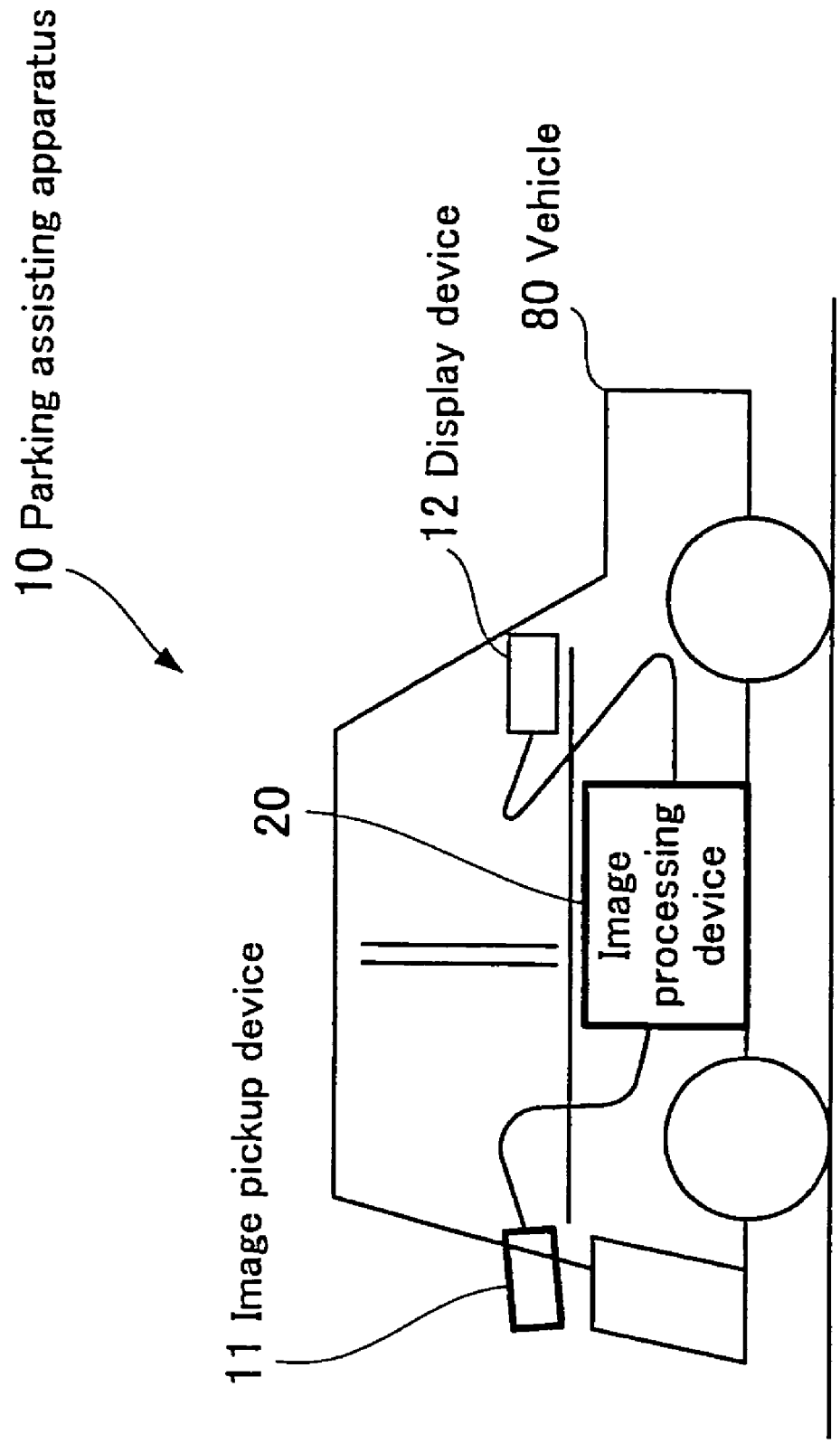
FIG. 1 is a block diagram showing a first preferred embodiment of a parking assisting apparatus according to the present invention and a vehicle.

As best shown in FIG. 1, the present embodiment of the parking assisting apparatus 10 comprises image pickup means constituted by an image pickup device 11 for picking up an image of an area behind a vehicle 80; display means constituted by a display device 12 for displaying the image picked up by the image pickup device 11 to a vehicle driver of the vehicle 80; and image processing means constituted by an image processing device 20 for having the display device 12 display a parking assisting guide for assisting the vehicle driver in parking the vehicle 80 superposed on the image picked up by the image pickup device 11.

Figure 2:
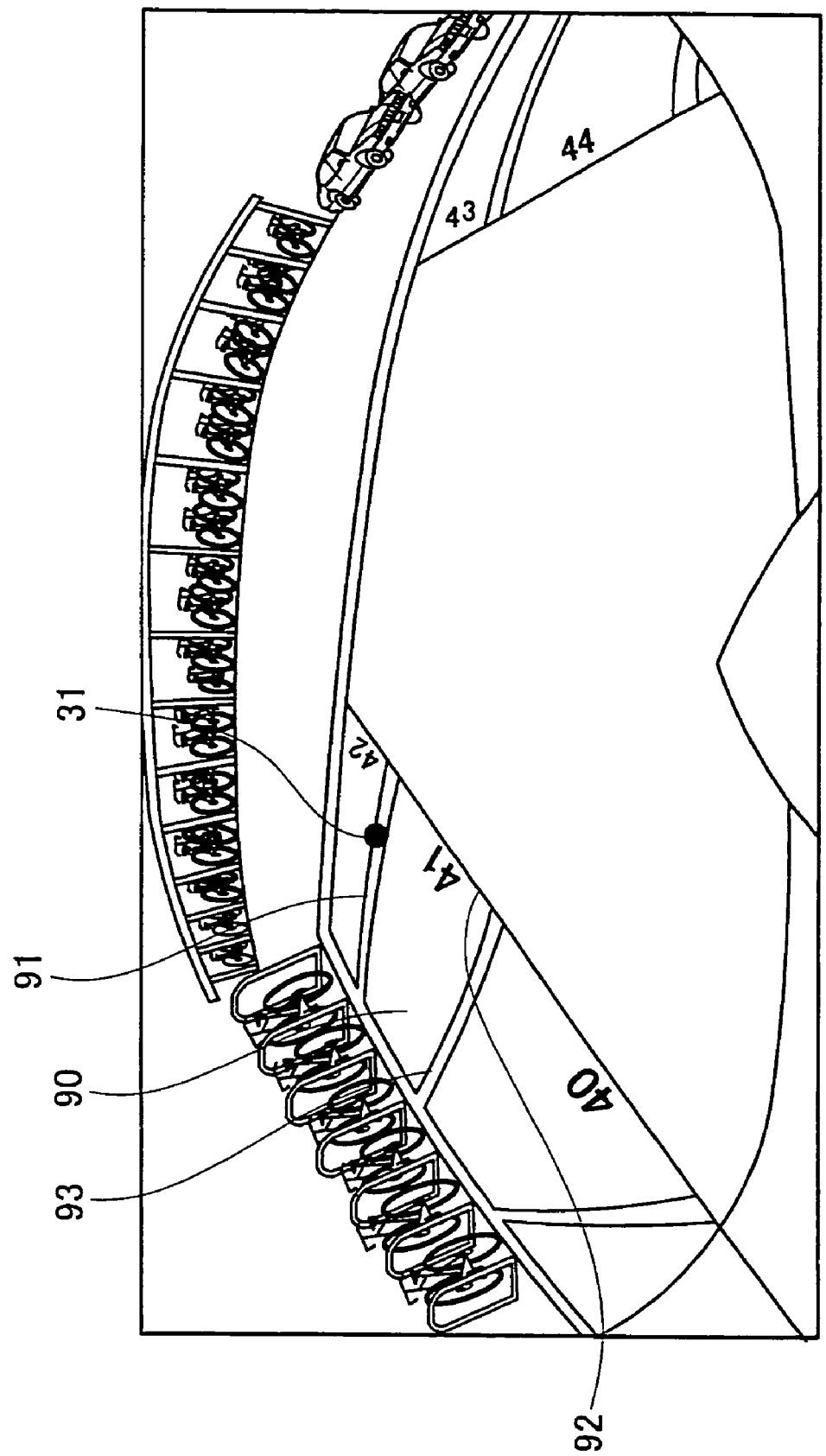
FIG. 2 is a view showing an image displayed by a display unit forming part of the parking assisting apparatus shown in FIG. 1.

The image processing device 20 is adapted to have the display device 12 display, as the parking assisting guide, a steering start marker 31 (see FIG. 2) for notifying the vehicle driver of start of steering of the vehicle 80.

Figure 3:
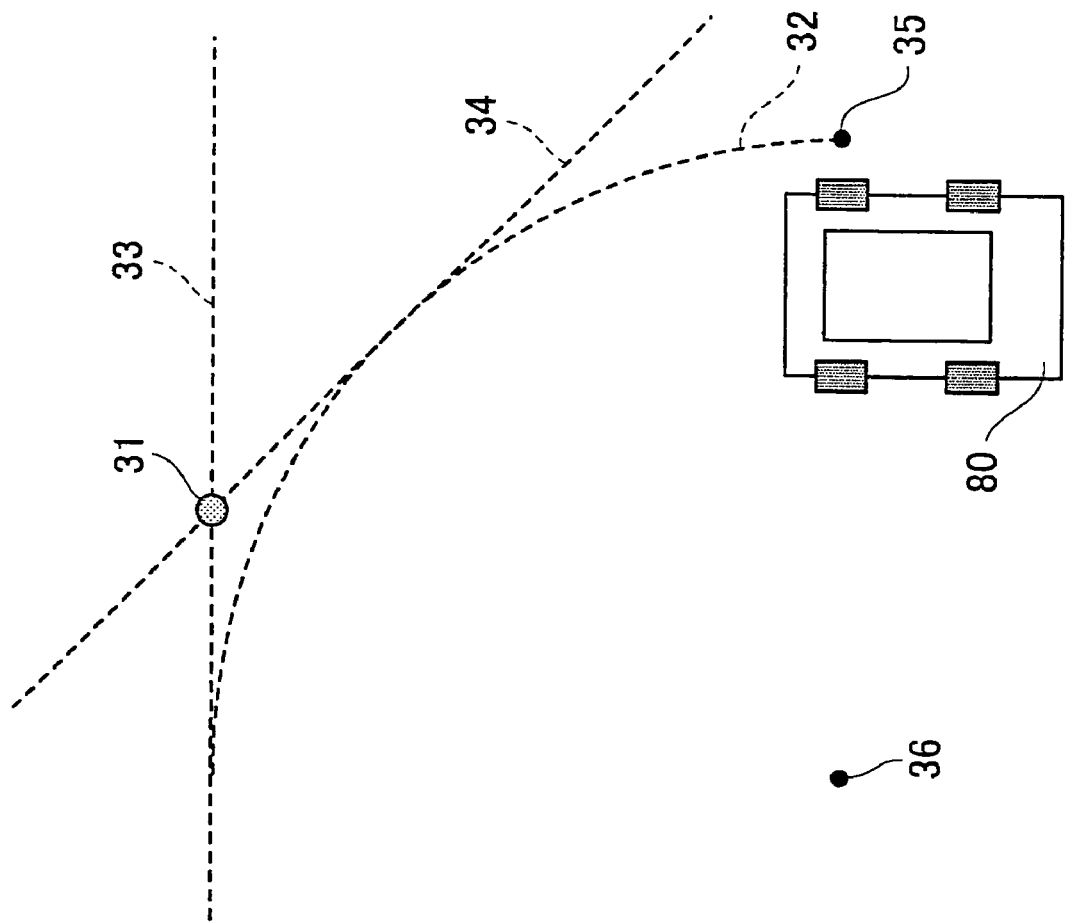
FIG. 3 is a view explaining a parking assisting guide applied by the parking assisting apparatus shown in FIG. 1.

The steering start marker 31 is shown in FIG. 3 as being constituted by an intersection of tangential lines 33 and 34 respectively tangent to a predetermined track 32 at two different points. Here, the predetermined track 32 is intended to mean a track expected to be drawn by a predetermined fixed point 35 fixed with respect to the vehicle 80 while the vehicle 80 is driven backwardly at the maximum steering angle, and the fixed point 35 is intended to mean a point located on the side opposite to a center 36 of a rotation of the vehicle 80 around which the vehicle 80 is expected to rotate while the vehicle 80 is driven backwardly at the maximum steering angle, with respect to the vehicle 80. It is hereinlater assumed that the fixed point 35 is a point on a line collinearly extending from a rear wheel axis forming part of the vehicle 80, spaced apart from the side portion forming part of the vehicle 80 at a constant distance, and located on the side opposite to a center 36 of a rotation of the vehicle 80 around which the vehicle is expected to rotate while the vehicle 80 is driven backwardly at the maximum steering angle, with respect to the vehicle 80.

Figure 4:
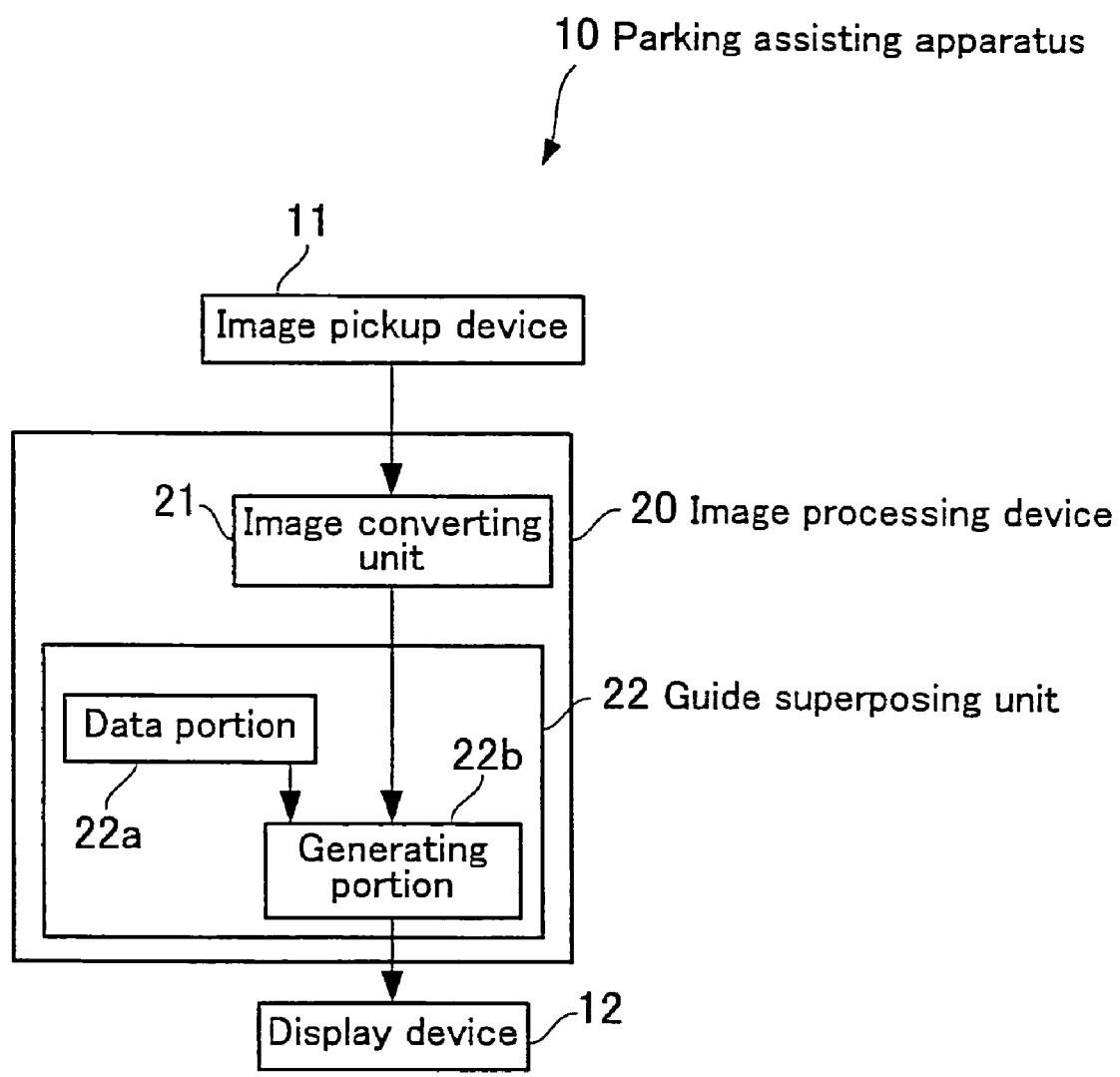
FIG. 4 is a block diagram showing a construction of the parking assisting apparatus shown in FIG. 1.

As clearly seen from FIG. 4, the image processing device 20 comprises an image converting unit 21 for carrying out various image converting processes of converting the image picked up by the image pickup device 11, and a guide superposing unit 22 for superposing a parking assisting guide on the image converted by the image converting unit 21. The image converting processes carried out by the image converting unit 21 includes, for example, a process of compensating distortions caused by lens forming part of the image pickup device 11.

The guide superposing unit 22 comprises a data portion 22a for storing therein data indicative of the parking assisting guide including a position and a color of the parking assisting guide to be displayed on the image, and a generating portion 22b for generating an image signal to be outputted to the display device 12. The generating portion 22b is designed to generate the image signal indicative of an image having the parking assisting guide superposed on the image converted by the image converting unit 21 based on the image data in series inputted from the image converting unit 21 and the data stored in the data portion 22a. This means that the guide superposing unit 22 can superpose any kind of parking assisting guide on the image by replacing the data stored in the data portion 22a.

Now, the method of double parking operating the parking assisting apparatus 10 will be described hereinlater.

Figure 5:
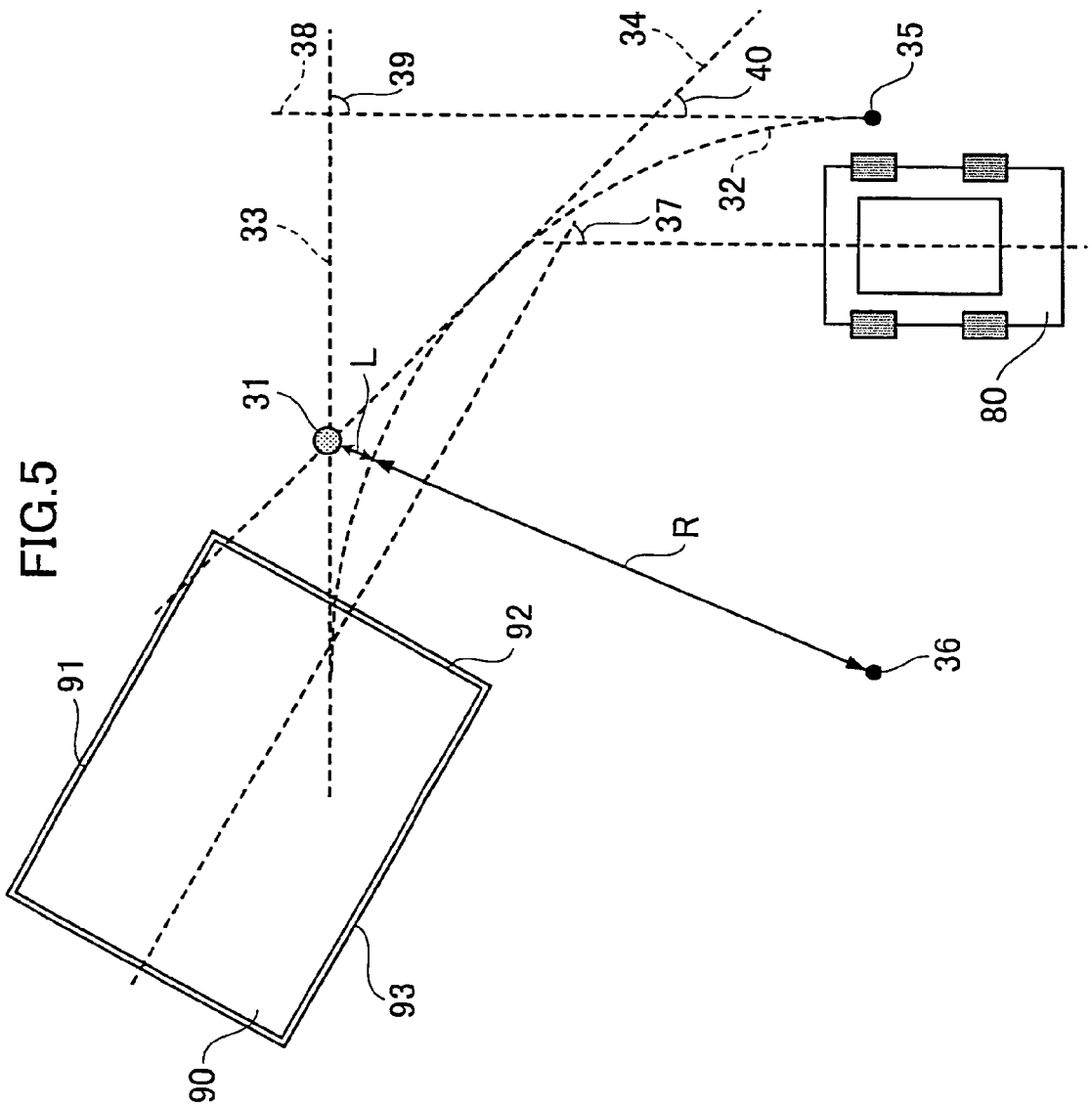
FIG. 5 is a block diagram explaining a parking assisting method carried out by the parking assisting apparatus shown in FIG. 1 in the case that the vehicle is located relatively far from a parking place at a time point when a vehicle driver starts parking the vehicle.

The description will be direct to the method of double parking in the case that the vehicle 80 is located relatively far from a parking place 90 at the start of parking the vehicle 80 as shown in FIG. 5.

A vehicle driver starts parking the vehicle 80 operating the parking assisting apparatus 10 (see FIG. 4) when an angle 37 defined by a line extending toward a driving direction of the vehicle 80 with respect to a center line of the parking place 90 is ranging between an angle 39 defined by a tangential line 33 with respect to a track 38 expected to be drawn by a predetermined fixed point 35 while the vehicle 80 is driven straight backwardly and an angle 40 defined by a tangential line 34 with respect to the track 38.

Figure 6:
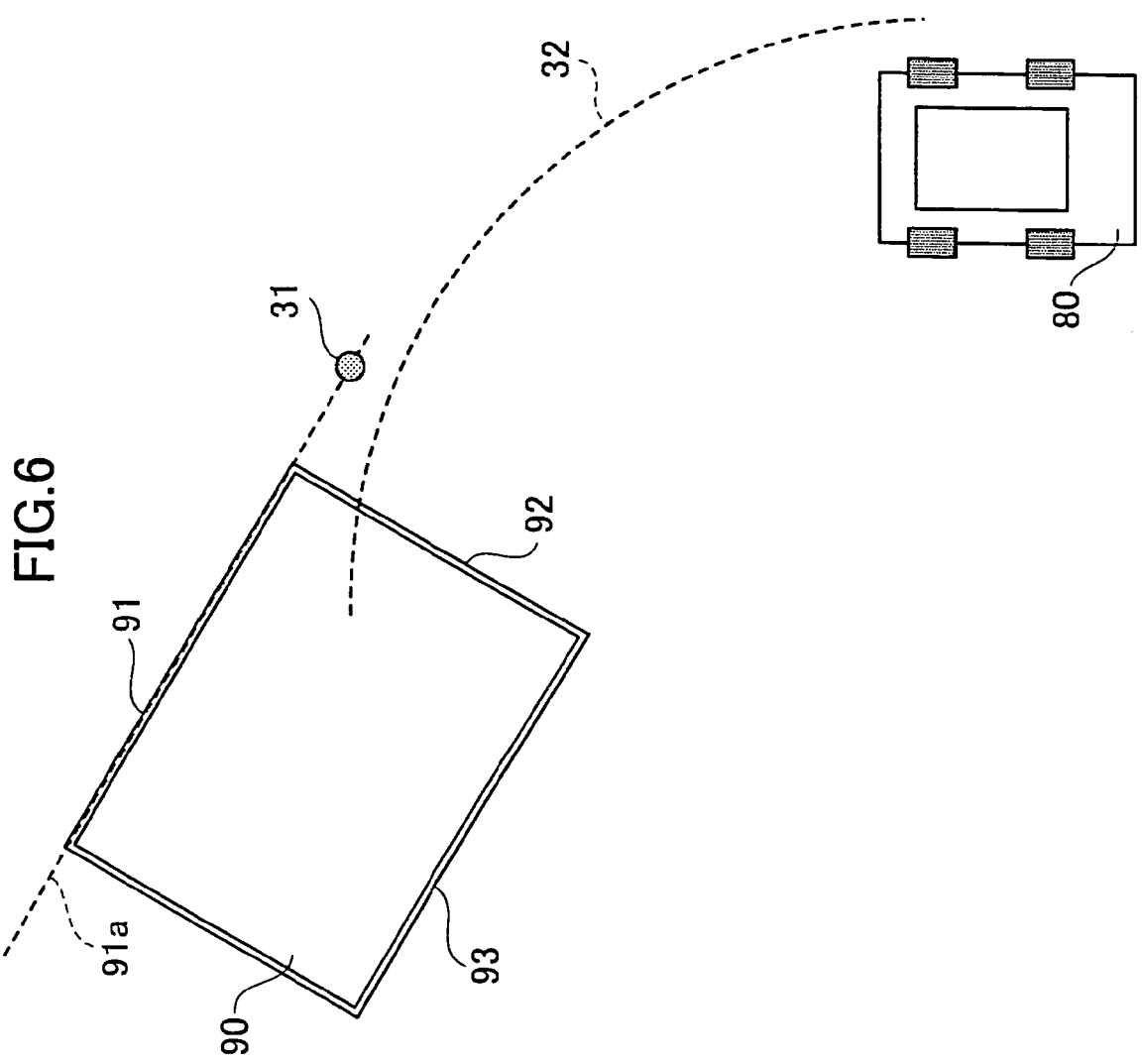
FIG. 6 is a view similar to FIG. 5 explaining the parking assisting method carried out by the parking assisting apparatus shown in FIG. 1 but showing that the vehicle is further driven.

The vehicle 80 is driven straight backwardly by the vehicle driver watching the image displayed by the display device 12 (see FIG. 4) until a steering start marker 31 is placed on a line 91a passing through a remoter boundary line 91 of the parking place 90 as shown in FIG. 6.

Figure 7:
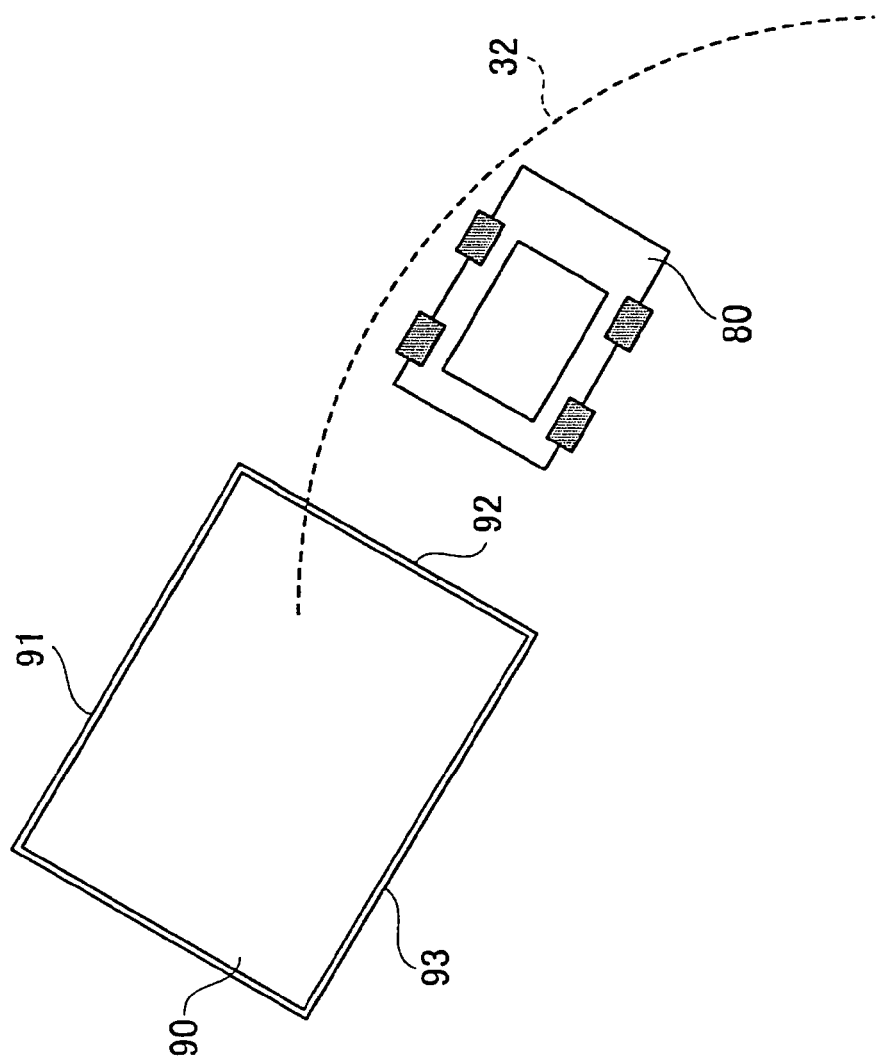
FIG. 7 is a view similar to FIG. 6 explaining the parking assisting method carried out by the parking assisting apparatus shown in FIG. 1 but showing that the vehicle is further driven.

When the steering start marker 31 is placed on the line 91a, the vehicle 80 is driven by the vehicle driver backwardly at the maximum steering angle as shown in FIG. 7 until the angle 37 defined by the line extending toward the driving direction of the vehicle 80 with respect to the center line of the parking place 90 (see FIG. 5) becomes approximately zero degree.

Figure 8:
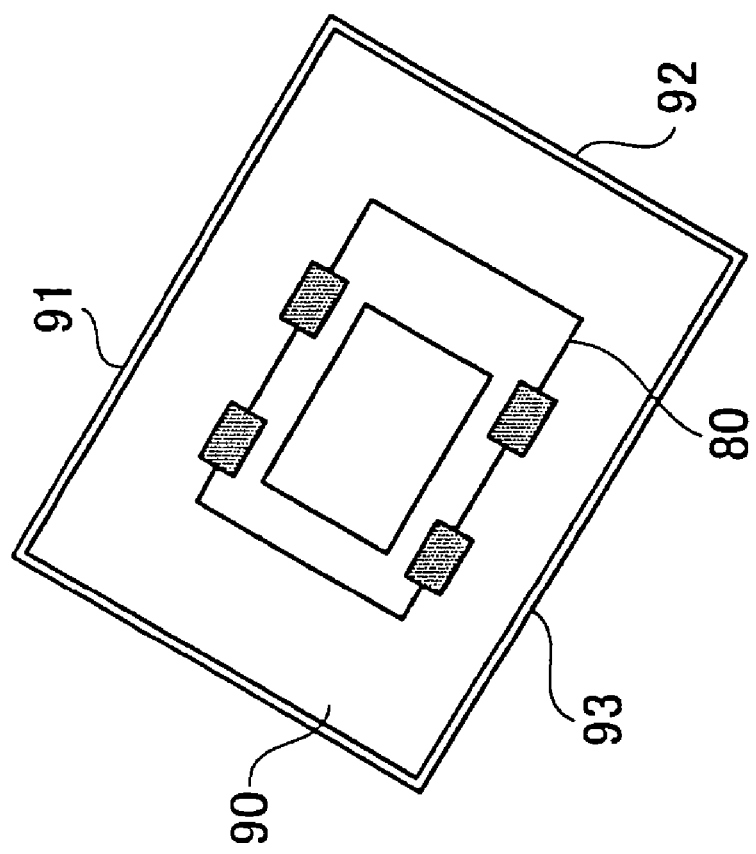
FIG. 8 is a view similar to FIG. 7 explaining the parking assisting method carried out by the parking assisting apparatus shown in FIG. 1 but showing that the vehicle is further driven.

When the angle 37 defined by the line extending toward the driving direction of the vehicle 80 with respect to the center line of the parking place 90 (see FIG. 5) becomes approximately zero degree, the vehicle 80 can be driven straight backwardly by the vehicle driver to have the vehicle 80 parked in the parking place 90 as shown in FIG. 8.

Figure 9:
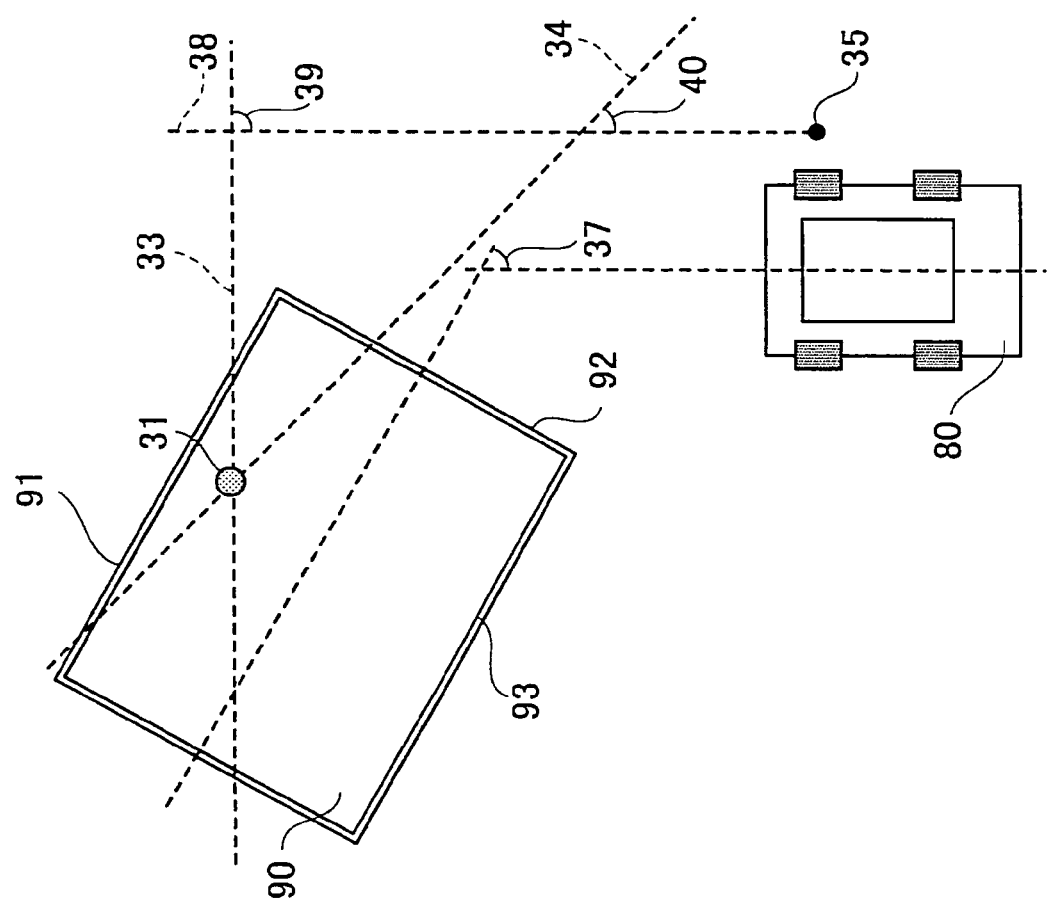
FIG. 9 is a block diagram explaining a parking assisting method carried out by the parking assisting apparatus shown in FIG. 1 in the case that the vehicle is located relatively close to a parking place at a time point when a vehicle driver starts parking the vehicle.

The description will be direct to the method of double parking in the case that the vehicle 80 is located relatively close to the parking place 90 at the start of parking the vehicle 80 as shown in FIG. 9.

A vehicle driver starts parking the vehicle 80 operating the parking assisting apparatus 10 (see FIG. 4) when an angle 37 defined by a line extending toward a driving direction of the vehicle 80 with respect to a center line of the parking place 90 is ranging between an angle 39 defined by a tangential line 33 with respect to a track 38 expected to be drawn by a predetermined fixed point 35 while the vehicle 80 is driven straight backwardly and an angle 40 defined by a tangential line 34 with respect to the track 38.

Figure 10:
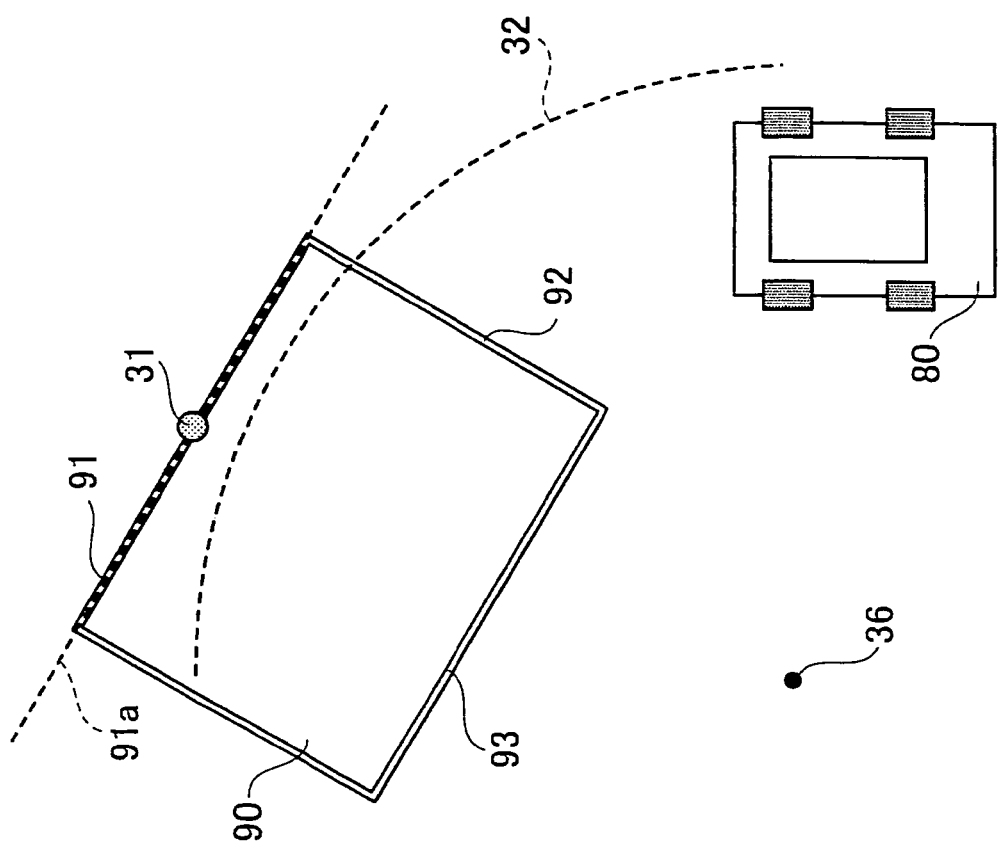

The vehicle 80 is driven straight backwardly by the vehicle driver watching the image displayed by the display device 12 (see FIG. 4) until a steering start marker 31 is placed on a line 91a passing through a remoter boundary line 91 of the parking place 90 as shown in FIG. 10.

When the steering start marker 31 is placed on the line 91a, the vehicle 80 is firstly driven by the vehicle driver backwardly at the maximum steering angle and secondly driven backwardly at steering angles gradually reduced to have the vehicle 80 parked in the parking place 90 as shown in FIG. 8.

Further, while it has been described in the above about the method that the vehicle 80 is firstly driven by the vehicle driver backwardly at the maximum steering angle and secondly driven backwardly at steering angles gradually reduced when the steering start marker 31 is placed on the line 91a as shown in FIG. 10, the vehicle 80 may be firstly driven by the vehicle driver backwardly at the maximum steering angle until the vehicle 80 is located in the vicinity of an entrance 92 of the parking place 90 and secondly turned about to have the vehicle 80 parked in the parking place 90 as shown in FIG. 8. This method makes it possible for the vehicle driver just to repeatedly turn about the vehicle 80 in similar manner every time when the vehicle 80 is parked because of the fact that the vehicle 80 approaches to a closer boundary line 93 of the parking place 90 in stead of the remoter boundary line 91 of the parking place 90 after the vehicle 80 is driven backwardly in the vicinity of the entrance 92 of the parking place 90. This leads to the fact that the vehicle driver can acquire parking skills in a relatively short period of time.

Further, the angles 39 and 40 respectively defined by the tangential lines 33 and 34 with respect to the track 38 expected to be drawn by the fixed point 35 while the vehicle 80 is driven straight backwardly may be set at arbitrary values, as clearly shown in FIG. 5. Here, the efficiency of the present embodiment becomes more apparent when the angles 39 and 40 defined by the tangential lines 33 and 34 with respect to the track 38 are respectively set approximately at 90 and 45 degrees. The parking operation starts once the vehicle 80 is driven forwardly past the front of the entrance 92 of the parking place 90 in order to double park the vehicle. It is often the case that the parking operation starts when the angle 37 defined by the line extending toward the driving direction of the vehicle 80 with respect to the center line of the parking place 90 is equal to or greater than zero degree but smaller than 45 degree. It is to be noted that even a vehicle driver with little experience in driving can relatively easily park the vehicle 80 in the parking place 90 without operating the parking assisting apparatus 10 when the angle 37 defined by the line extending toward the driving direction of the vehicle 80 with respect to the center line of the parking place 90 is approximately greater than zero degree but smaller than 45 degree because of the fact that the vehicle driver can relatively easily gain an understanding of a relationship between the vehicle 80 and the parking place 90. On the other hand, it is difficult for a vehicle driver with little experience in driving to gain an understanding of a relationship between the vehicle 80 and the parking place 90 and park the vehicle 80 when the angle 37 defined by the line extending toward the driving direction of the vehicle 80 in the parking place 90 with respect to the center line of the parking place 90 is approximately greater than 45 degree but smaller than 90 degree. This leads to the fact that the present embodiment can efficiently assist the vehicle driver with little experience in driving in parking operation when the angles 39 and 40 defined by the tangential lines 33 and 34 with respect to the track 38 are respectively set approximately at 90 and 45 degrees. Further, a distance L between the track 32 and the steering start marker 31 is represented in accordance with "expression 1" when the angles 39 and 40 defined by the tangential lines 33 and 34 with respect to the track 38 are respectively set approximately at 90 and 45 degrees wherein "R" is intended to mean a turning radius when the vehicle 80 is driven backward at the maximum steering angle. This means that "L" becomes 41 centimeter when "R" is 500 centimeter. This leads to the fact that the vehicle driver is required to turn a steering wheel just to make a fine adjustment of the location of the vehicle 80.

$$L = R\left(\frac{1}{\cos(22.5°)} - 1\right) \quad \text{[Expression 1]}$$

From the foregoing description, it will be understood that the present embodiment of the parking assisting apparatus 10 makes it easier for a vehicle driver to park the vehicle 80 even though the vehicle 80 may not be located substantially in perpendicular relationship with the parking place 90 at the time point when the vehicle driver starts parking the vehicle 80, resulting from the fact that the parking assisting apparatus 10 can let the vehicle driver know when to start to turn the steering wheel of the vehicle 80 with the steering start marker 31.

Further, the present embodiment of the parking assisting apparatus 10 makes it possible for a vehicle driver to park even though there may be not provided a large area in front of the entrance 92 of the parking place, resulting from the fact that the parking assisting apparatus 10 enables the vehicle driver to park the vehicle 80 even though the vehicle 80 is located in relatively close vicinity of the parking place 90.

Further, the present embodiment of the parking assisting apparatus 10 can let the vehicle driver know when to start to turn the steering wheel of the vehicle 80 simply by allowing the vehicle driver to drive the vehicle 80 straight backwardly until the steering start marker 31 is placed on the line 91a passing through the remoter boundary line 91 of the parking place 90.

Further, the present embodiment of the parking assisting apparatus 10 can display lines on the road such as, for example, the boundary line 91 of the parking place 90, as straight lines on the image displayed by the display device 12, and therefore, makes it easier for the vehicle driver to make judgments such as, for example, whether the lines on the image displayed by the display device 12 are parallel, in comparison with the case that the lines are displayed as distorted lines on the image displayed by the display device 12, resulting from the fact that the parking assisting apparatus 10 is provided with the image converting unit 21. It is needless to mention that the parking assisting apparatus 10 may not be provided with the image converting unit 21.

Second Preferred Embodiment

The construction of the present embodiment of the parking assisting apparatus will be described hereinlater.

The constitutional elements of the present embodiment of the parking assisting apparatus the same as those of the first embodiment of the parking assisting apparatus 10 (see FIG. 4) will not be described in detail but bear the same reference numerals as those of the first embodiment of the parking assisting apparatus 10.

The present embodiment of the parking assisting apparatus 110 is the same in construction as the parking assisting apparatus 10 (see FIG. 4) comprises a an image processing device 120 in place of the image processing device 20 (see FIG. 4).

Figure 12:
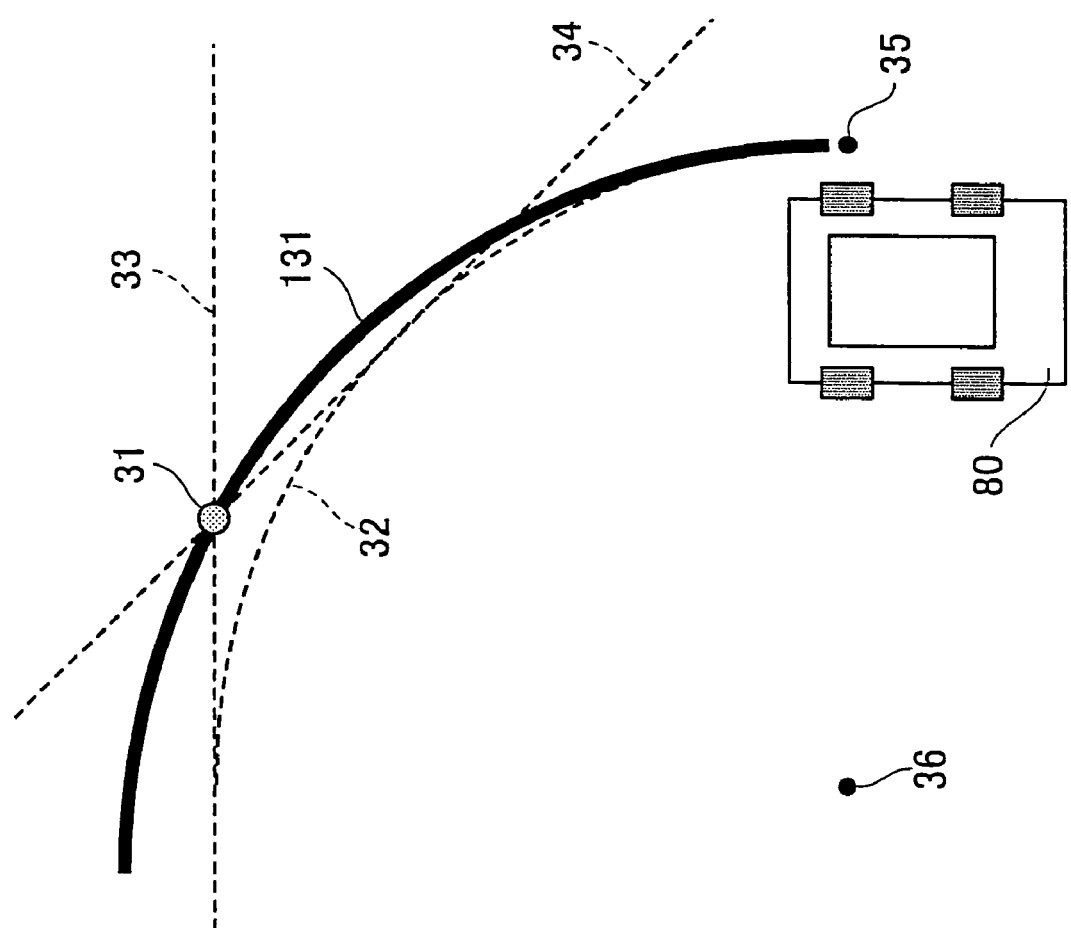
FIG. 12 is a view explaining a parking assisting guide applied by the parking assisting apparatus shown in FIG. 11.

The image processing device 120 is the same in construction as the image processing device 20 further comprising a track calculating unit 121 for calculating a current steering angle track 131 (see FIG. 12) expected to be drawn by the fixed point 35 (see FIG. 12) while the vehicle 80 (see FIG. 12) is driven backwardly at a current steering angle.

The track calculating unit 121 is designed to calculate a current steering angle track 131, in accordance with Ackerman's model, based on a steering angle signal indicative of a driving direction of the vehicle 80 such as, for example, an angle signal from a steering wheel of the vehicle 80, inputted from an external unit, and predetermined dimensions of the vehicle 80 such as, for example, a wheel base length and a vehicle width of the vehicle 80. Further, the track calculating unit 121 is adapted to calculate a position in the image on which the current steering angle track 131 is to be projected based on camera parameters such as, for example, a field angle, an installed position of the image pickup device 11, and the like. The track calculating unit 121 is operative to output data thus calculated to the data portion 22a of the guide superposing unit 22.

Figure 11:
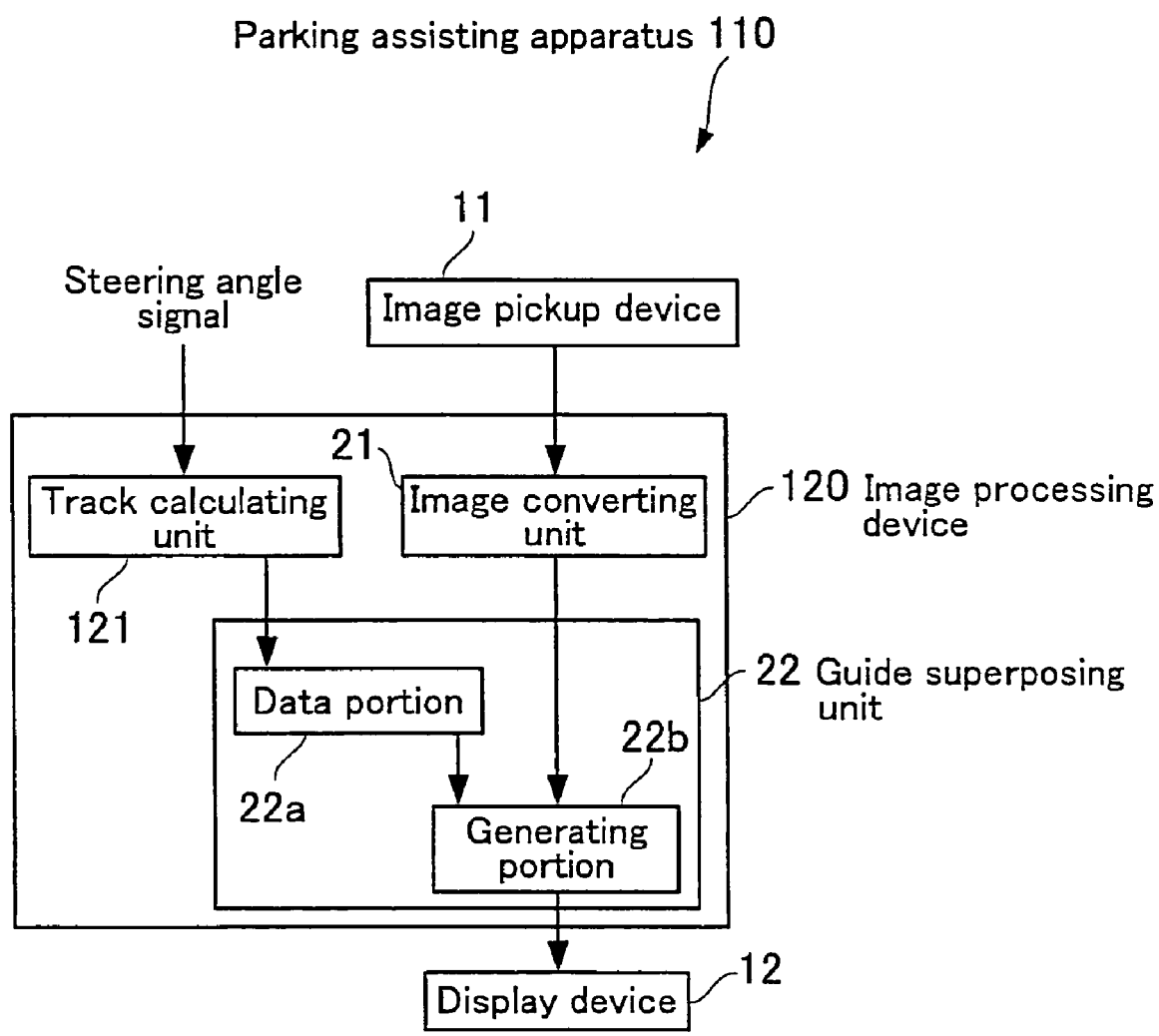
FIG. 11 is a block diagram showing a construction of a second embodiment of a parking assisting apparatus according to the present invention.
Figure 13:
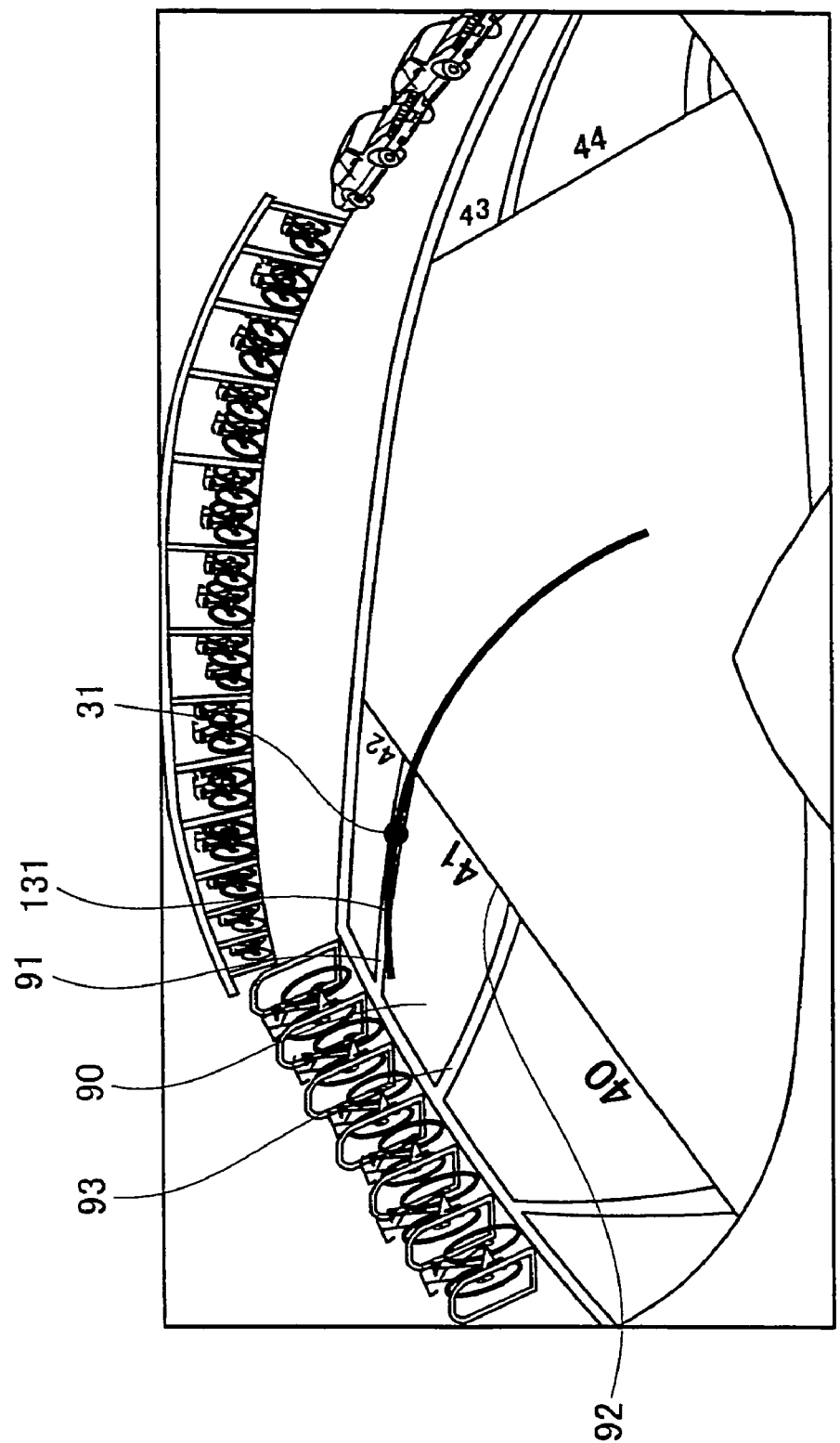
FIG. 13 is a view showing an image displayed by a display unit forming part of the parking assisting apparatus shown in FIG. 11.

This means that the image processing device 120 thus constructed allows the display device 12 (see FIG. 11) to display the steering start marker 31 and the current steering angle track 131 as the parking assisting guide as clearly shown in FIG. 13.

Now, the method of double parking operating the parking assisting apparatus 110 will be described hereinlater.

Figure 14:
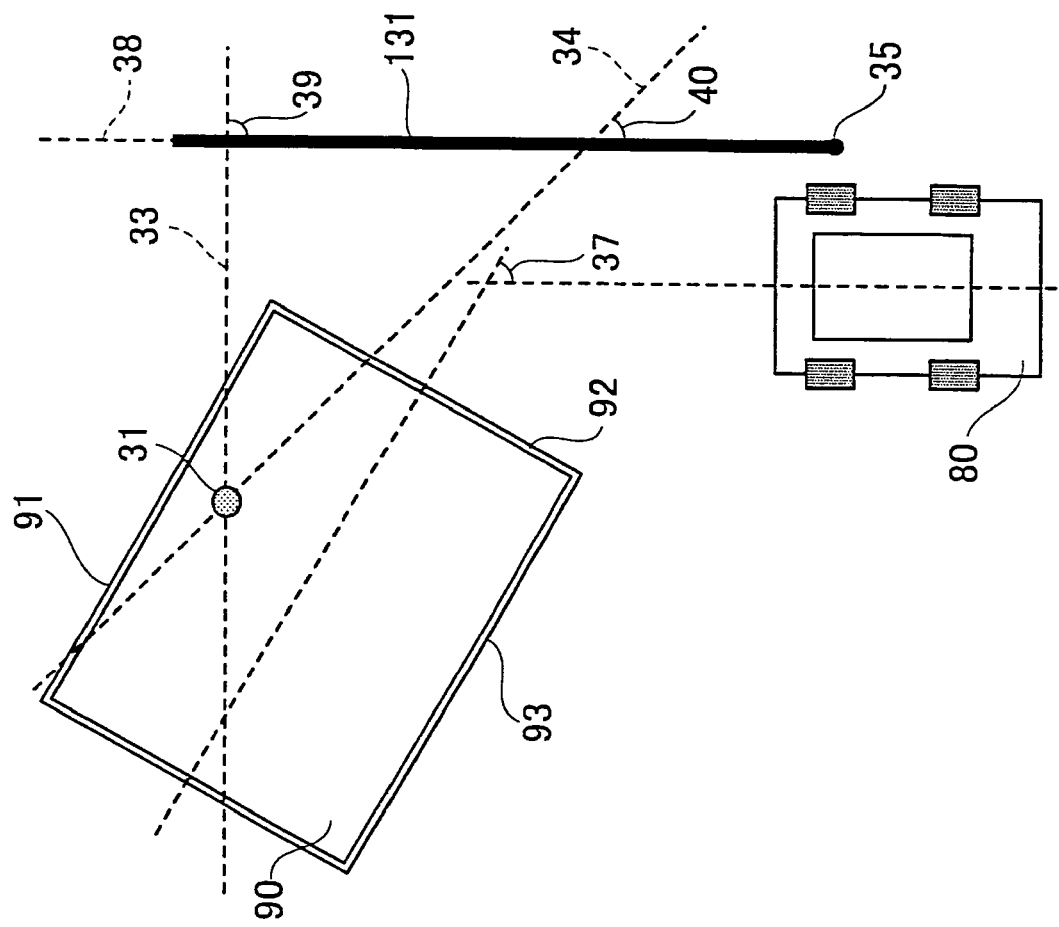
FIG. 14 is a block diagram explaining a parking assisting method carried out by the parking assisting apparatus shown in FIG. 11.

A vehicle driver starts parking the vehicle 80 operating the parking assisting apparatus 110 (see FIG. 11) when an angle 37 defined by a line extending toward a driving direction of the vehicle 80 with respect to a center line of the parking place 90 is ranging between an angle 39 defined by a tangential line 33 with respect to a track 38 expected to be drawn by a predetermined fixed point 35 while the vehicle 80 is driven straight backwardly and an angle 40 defined by a tangential line 34 with respect to the track 38, as shown in FIG 14.

Figure 15:
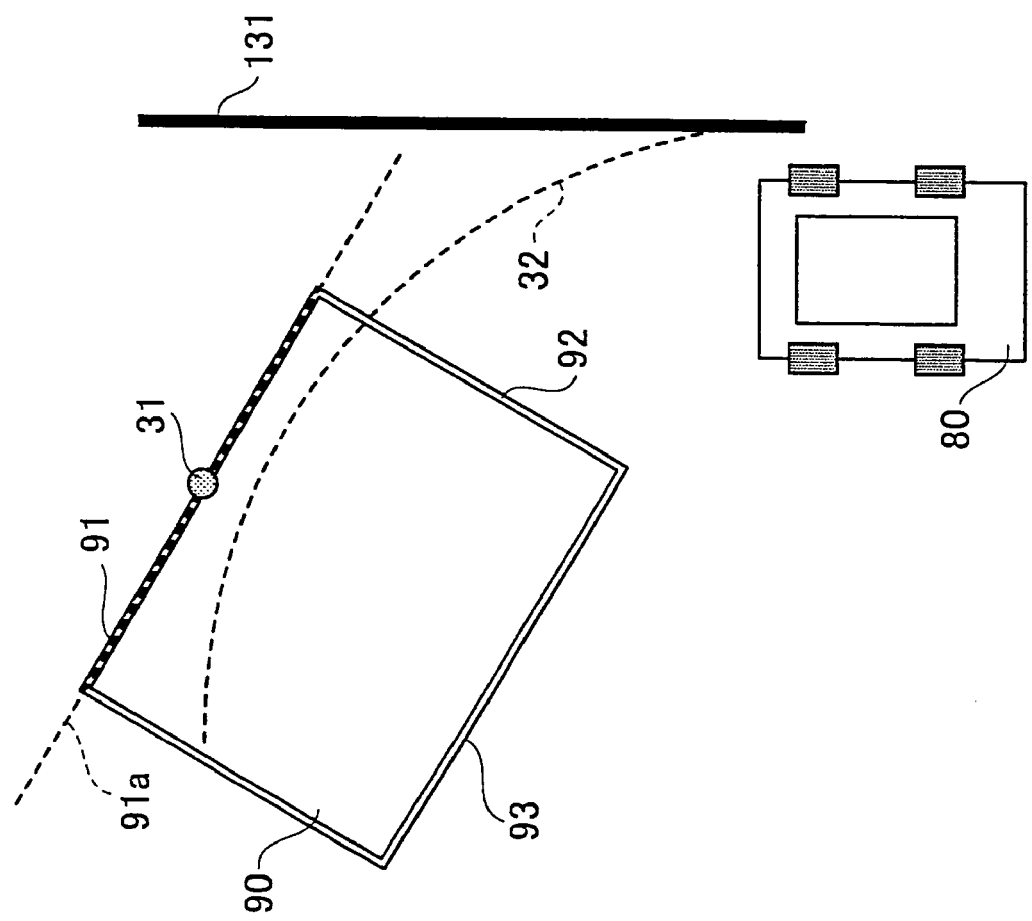
FIG. 15 is a view similar to FIG. 14 explaining the parking assisting method carried out by the parking assisting apparatus shown in FIG. 11 but showing that the vehicle is further driven.

The vehicle 80 is driven straight backwardly by the vehicle driver watching the image displayed by the display device 12 (see FIG. 11) until a steering start marker 31 is placed on a line 91a passing through a remoter boundary line 91 of the parking place 90 as shown in FIG. 15.

When the steering start marker 31 is placed on the line 91a, the track 32 is placed either on the line 91a or on the side of the vehicle 80 with respect to the line 91a.

Figure 16:
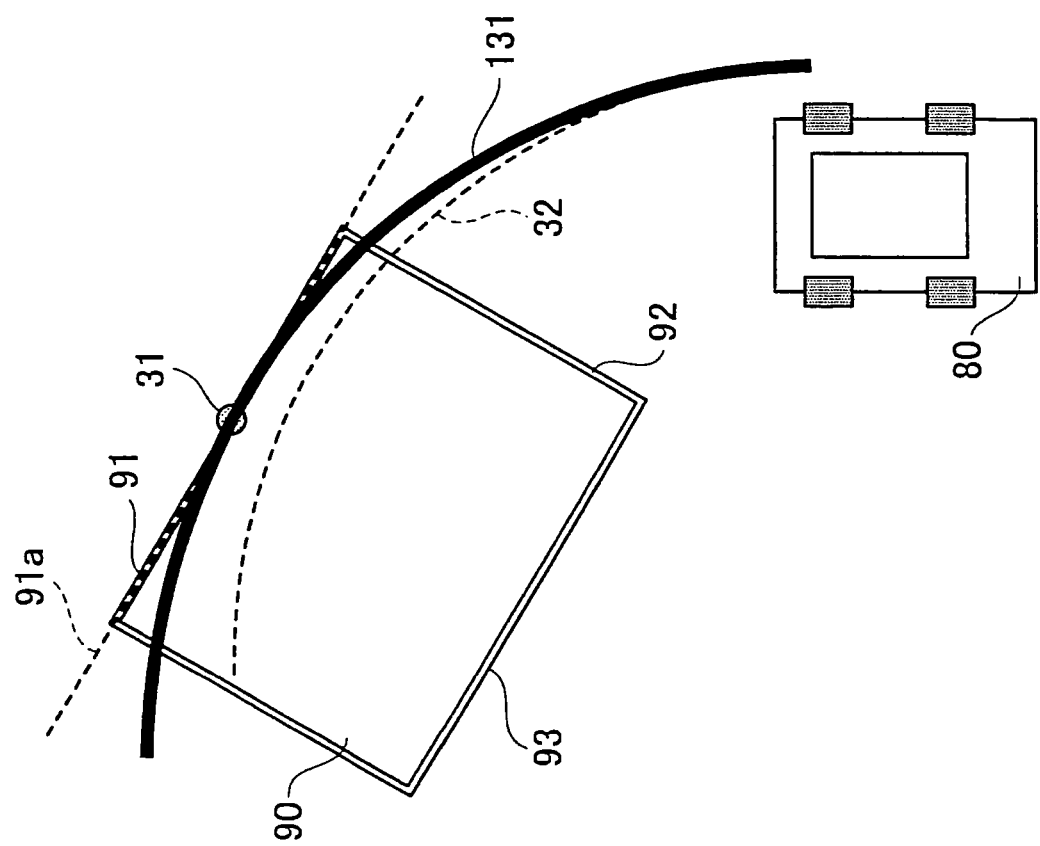
FIG. 16 is a view similar to FIG. 15 explaining the parking assisting method carried out by the parking assisting apparatus shown in FIG. 11 but showing that the vehicle is further driven.
Figure 17:
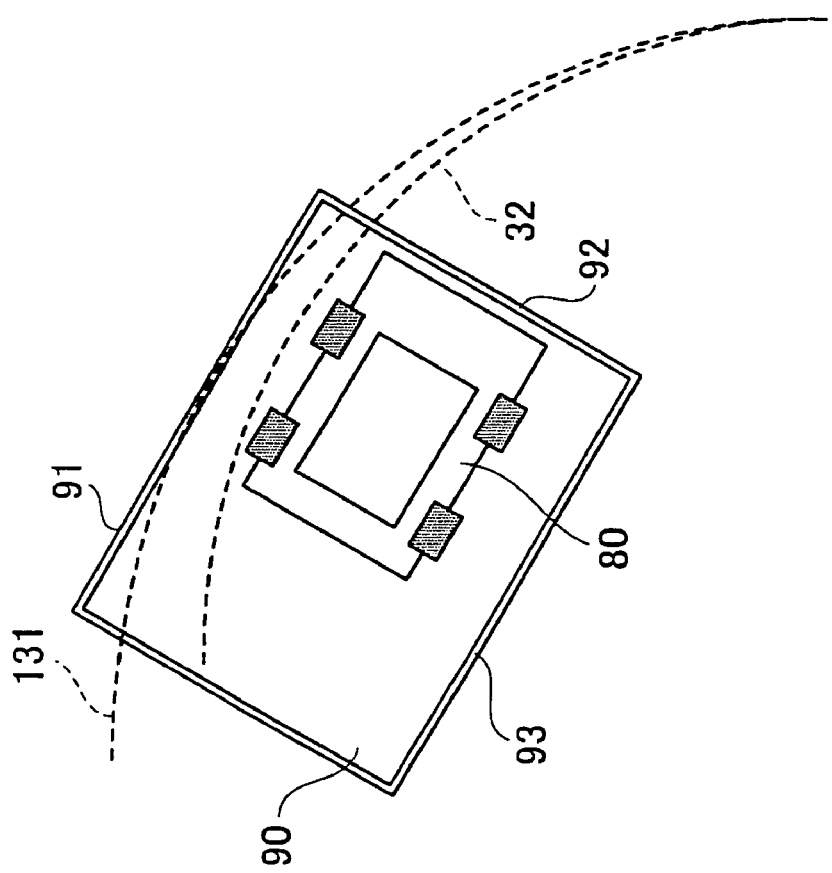
FIG. 17 is a view similar to FIG. 16 explaining the parking assisting method carried out by the parking assisting apparatus shown in FIG. 11 but showing that the vehicle is further driven.

This means that the steering wheel of the vehicle 80 can be turned by the vehicle driver at a steering angle to the degree that the line 91a becomes tangent to the current steering angle track 131 when the steering start marker 31 is placed on the line 91a as shown in FIG. 16. The vehicle 80 can be then driven backward with the steering angle maintained until the angle 37 (see FIG. 14) defined by the line extending toward the driving direction of the vehicle 80 with respect to the center line of the parking place 90 becomes substantially zero degree as shown in FIG. 17.

When the angle 37 defined by the line extending toward the driving direction of the vehicle 80 with respect to the center line of the parking place 90 becomes substantially zero degree, the vehicle 80 can be further driven straight forward and/or backward by the vehicle driver to make an adjustment of the front and/or back of the vehicle 80 with respect to the parking place 90 to have the vehicle 80 parked in the parking place 90 as shown in FIG. 8.

From the foregoing description, it will be understood that the present embodiment of the parking assisting apparatus 110 makes it easier for the vehicle driver to park the vehicle 80 in comparison with the first embodiment of the parking assisting apparatus 10 (see FIG. 4), resulting from the fact that the parking assisting apparatus 110 can let the vehicle driver know the optimum steering angle to have the vehicle parked in the parking place 90 with the current steering angle track 131.

Further, the present embodiment of the parking assisting apparatus 110 can display lines on the road such as, for example, the boundary line 91 of the parking place 90, as straight lines on the image displayed by the display device 12, and therefore, makes it easier for the vehicle driver to make judgments such as, for example, whether the lines on the image displayed by the display device 12 are parallel, in comparison with the case that the lines are displayed as distorted lines on the image displayed by the display device 12, resulting from the fact that the parking assisting apparatus 110 is provided with the image converting unit 21. It is needless to mention that the parking assisting apparatus 110 may not be provided with the image converting unit 21.

Third Preferred Embodiment

The construction of the present embodiment of the parking assisting apparatus will be described hereinlater.

The constitutional elements of the present embodiment of the parking assisting apparatus the same as those of the first embodiment of the parking assisting apparatus 10 (see FIG. 4) will not be described in detail but bear the same reference numerals as those of the first embodiment of the parking assisting apparatus 10.

Figure 18:
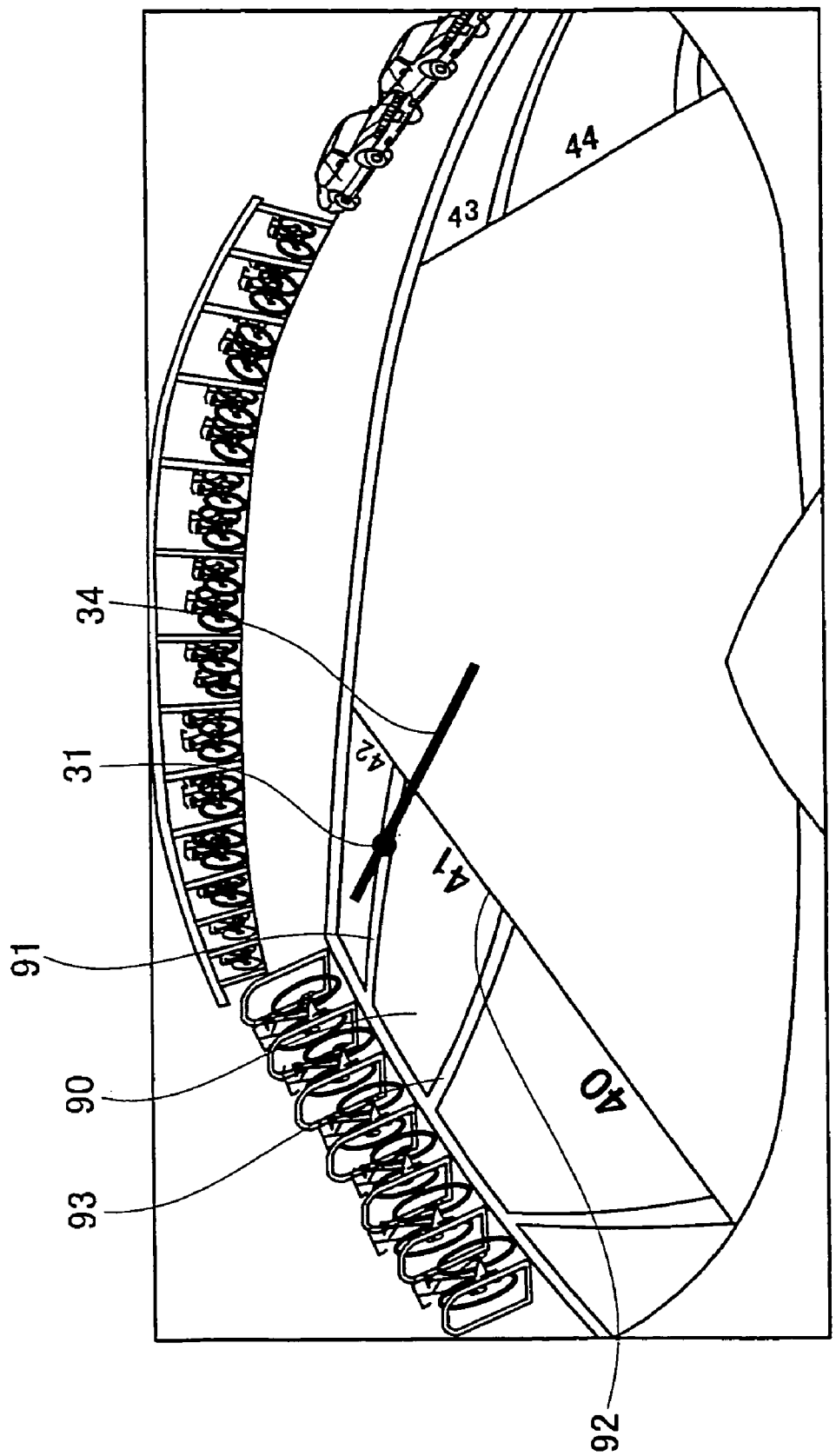
FIG. 18 is a view showing an image displayed by a display unit forming part of a third embodiment of a parking assisting apparatus according to the present invention.

The image processing device 20 (see FIG. 4) forming part of the present embodiment of the parking assisting apparatus is adapted to have the display device 12 (see FIG. 4) display, as the parking assisting guide, the steering start marker 31 and the tangential line 34 integral with the steering start marker 31 as shown in FIG. 18.

Here, the tangential line 34 constitutes a fixed guide fixed with respect to the steering start marker 31.

Now, the method of double parking operating the present embodiment of the parking assisting apparatus will be described hereinlater.

Figure 19:
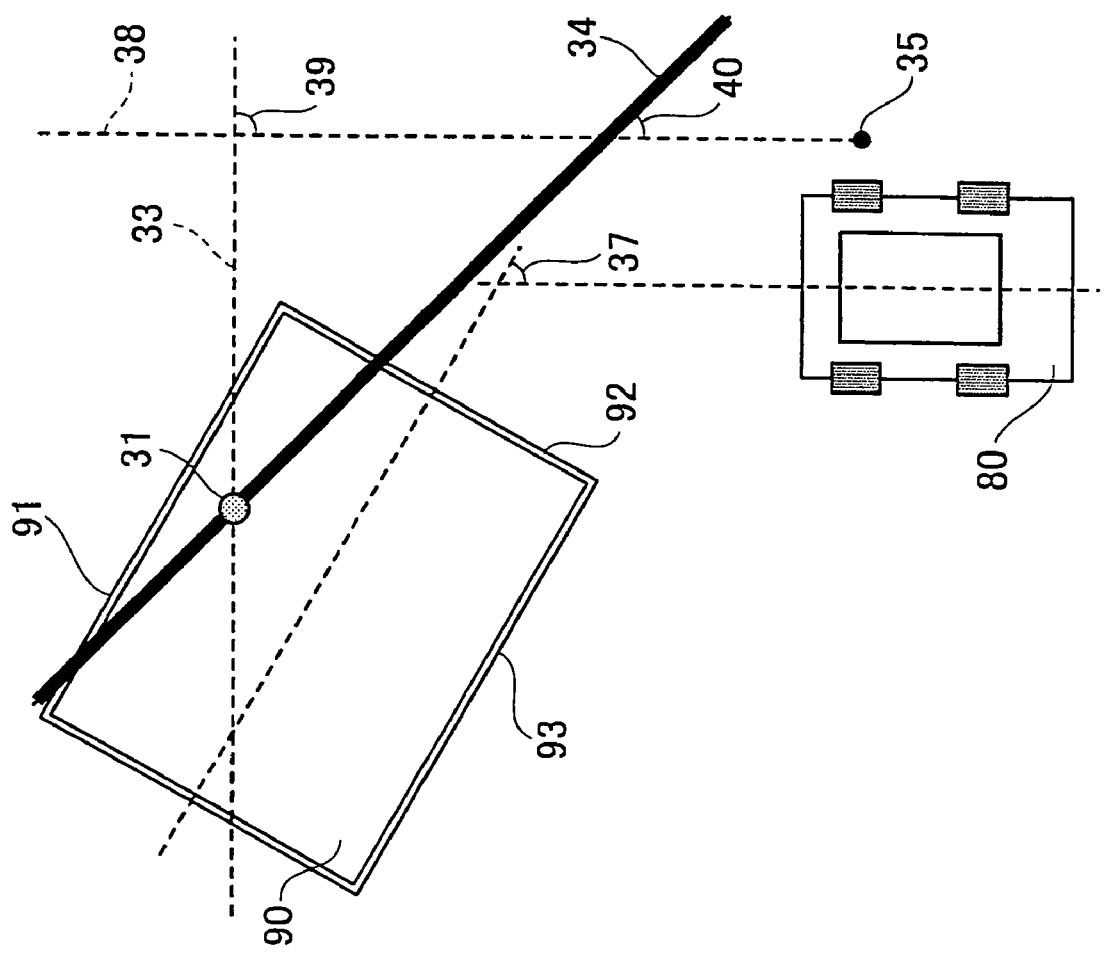
FIG. 19 is a block diagram explaining a parking assisting method carried out by the third embodiment of the parking assisting apparatus according to the present invention.

A vehicle driver starts parking the vehicle 80 operating the present embodiment of the parking assisting apparatus when the angle 37 defined by the line extending toward the driving direction of the vehicle 80 with respect to the center line of the parking place 90 is ranging between the angle 39 defined by the tangential line 33 with respect to the track 38 expected to be drawn by a predetermined fixed point 35 while the vehicle 80 is driven straight backwardly and the angle 40 defined by the tangential line 34 with respect to the track 38, as shown in FIG. 19.

The vehicle 80 is driven straight backwardly by the vehicle driver watching the image displayed by the display device 12

Figure 20:
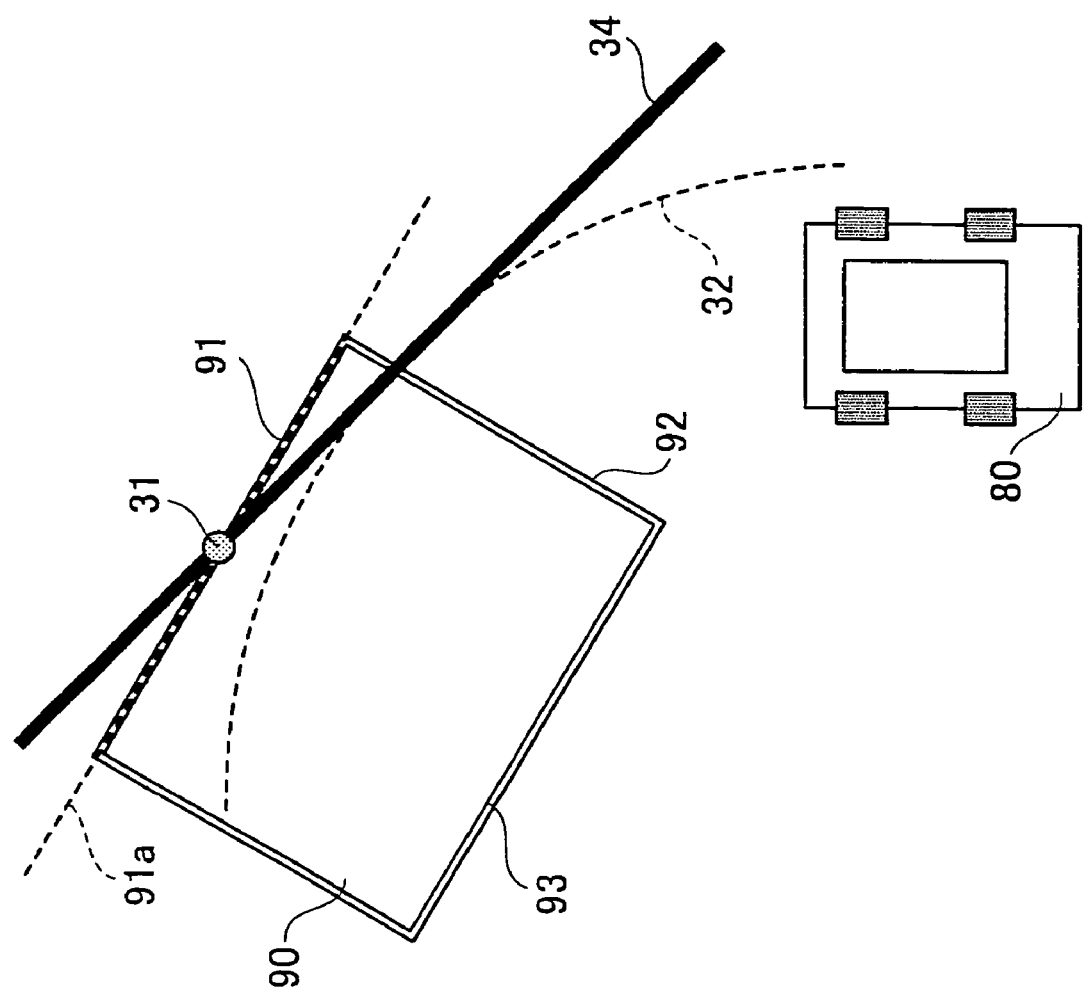
FIG. 20 is a view similar to FIG. 19 explaining the parking assisting method carried out by the third embodiment of the parking assisting apparatus according to the present invention but showing that the vehicle is further driven.

(see FIG. 1) until the steering start marker 31 is placed on the line 91a passing through the remoter boundary line 91 of the parking place 90 as shown in FIG. 20.

Figure 21:
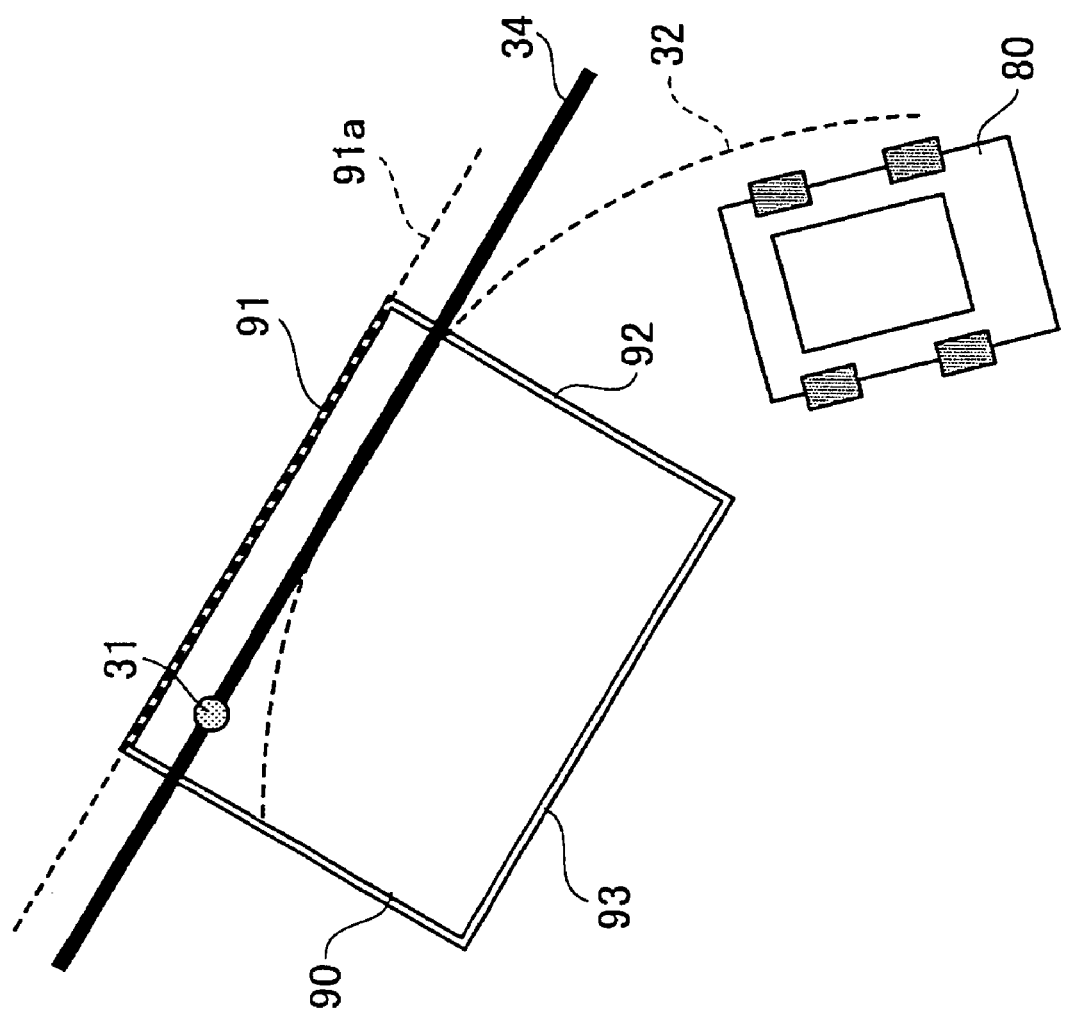
FIG. 21 is a view similar to FIG. 20 explaining the parking assisting method carried out by the third embodiment of the parking assisting apparatus according to the present invention but showing that the vehicle is further driven.

When the steering start marker 31 is placed on the line 91a, the vehicle 80 is driven backward at the maximum steering angle until a direction of the fixed guide constituted by the tangential line 34 is matched with a direction of the line 91a as shown in FIG. 21.

The tangential line 32 is placed either on the line 91a or on the side of the vehicle 80 with respect to the line 91a when the direction of the fixed guide constituted by the tangential line 34 is matched with the direction of the line 91a as shown in FIG. 21 because of the fact that the track 32 is placed either on the line 91a or on the side of the vehicle 80 with respect to the line 91a when the steering start marker 31 is placed on the line 91a as shown in FIG. 20

Figure 22:
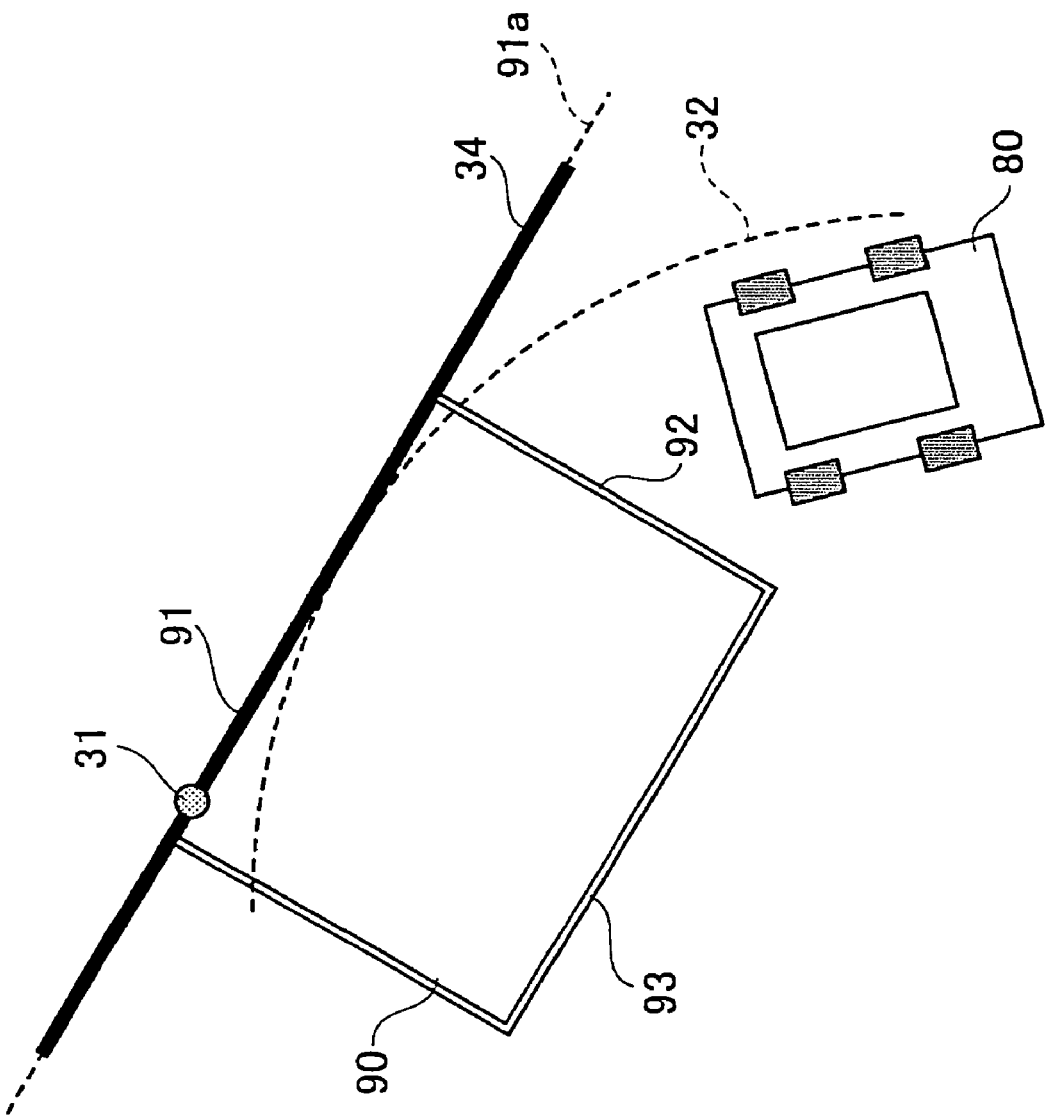
FIG. 22 is a view similar to FIG. 21 explaining the parking assisting method carried out by the third embodiment of the parking assisting apparatus according to the present invention but showing that the vehicle is further driven.

The vehicle 80 is driven straight backwardly until the tangential line 34 is placed on the line 91a as shown in FIG. 22 when the tangential line 34 is placed on the side of the vehicle 80 with respect to the line 91a after the direction of the tangential line 34 is matched with the direction of the line 91a.

Figure 23:
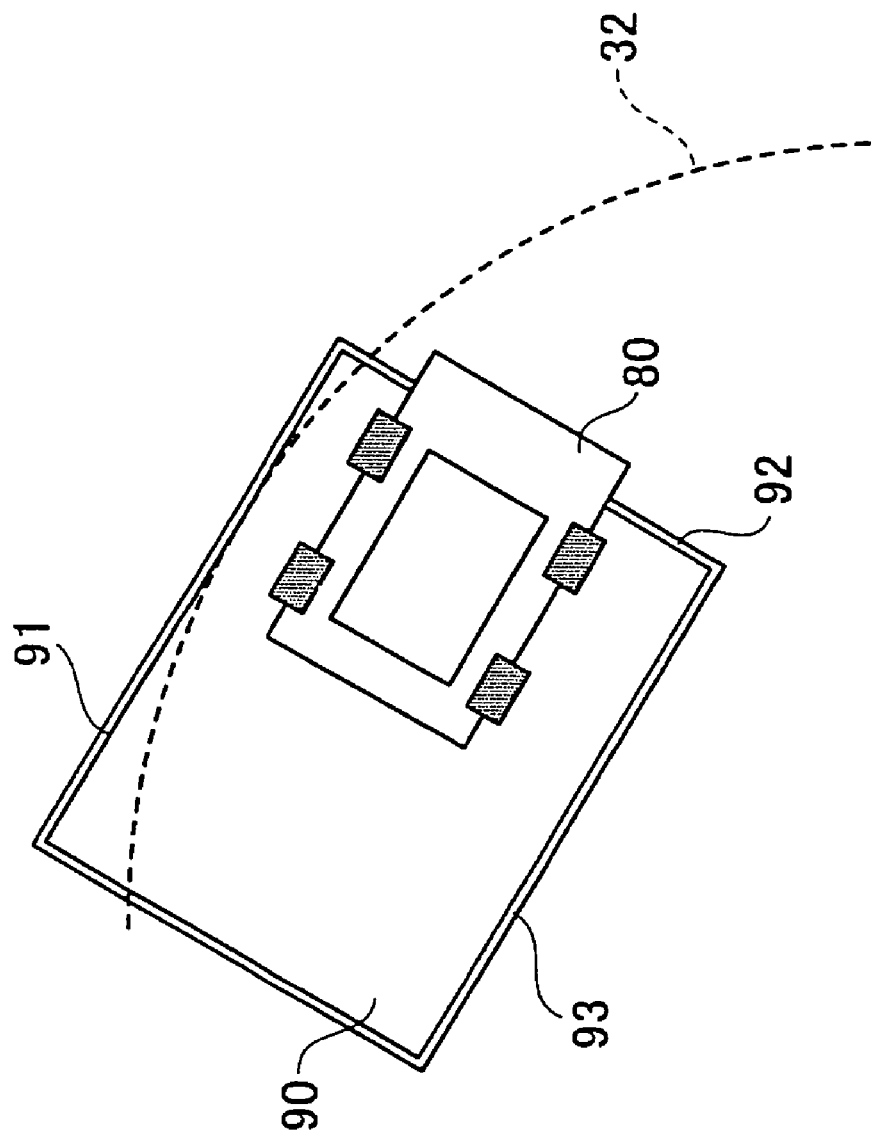
FIG. 23 is a view similar to FIG. 22 explaining the parking assisting method carried out by the third embodiment of the parking assisting apparatus according to the present invention but showing that the vehicle is further driven.

When the tangential line 34 is placed on the line 91a, the vehicle 80 is driven backwardly at the maximum steering angle until the angle 37 (see FIG. 19) defined by the line extending toward the driving direction of the vehicle 80 with respect to the center line of the parking place 90 becomes substantially zero degree as shown in FIG. 23.

When the angle 37 defined by the line extending toward the driving direction of the vehicle 80 with respect to the center line of the parking place 90 becomes substantially zero degree, the vehicle 80 can be further driven straight forward and/or backward by the vehicle driver to make an adjustment of the front and/or back of the vehicle 80 with respect to the parking place 90 to have the vehicle 80 parked in the parking place as shown in FIG. 8.

From the foregoing description, it will be understood that the present embodiment of the parking assisting apparatus makes it easier for the vehicle driver to park the vehicle 80 in comparison with the first embodiment of the parking assisting apparatus 10 (see FIG. 4), resulting from the fact that the present embodiment of the parking assisting apparatus can assist the vehicle driver in parking the vehicle 80 with the fixed guide constituted by the tangential line 34, in addition to the steering start marker 31.

The present embodiment of the parking assisting apparatus makes it easier for the vehicle driver to park the vehicle 80 in comparison with the first embodiment of the parking assisting apparatus 10, because of the fact that the vehicle driver is only required to drive the vehicle 80 straight or at the maximum steering angle backwardly after the start of the parking operation until the front and/or back of the vehicle 80 is adjusted with respect to the parking place 90 and thus eliminate the needs for the vehicle driver to shift the gear from reverse into forward, turn the steering wheel from the maximum steering angle to reduced steering angle, and the like.

Further, the present embodiment of the parking assisting apparatus can be made simpler in construction than the second embodiment of the parking assisting apparatus 110 (see FIG. 11), resulting from the fact that the present embodiment of the parking assisting apparatus is not required to receive the steering angle signal inputted from an external unit, and thus eliminate the need for the vehicle 80 to be equipped with the external unit for detecting the steering angle as in the case of the second embodiment of the parking assisting apparatus 110.

Further, the present embodiment of the parking assisting apparatus makes it easier for the vehicle driver to recognize the steering start marker 31 and the fixed guide as one parking assisting guide in comparison with the case that the steering start marker 31 and the fixed guide are separately displayed, resulting from the fact that the present embodiment of the parking assisting apparatus employs the tangential line 34 displayed as being integral with the steering start marker 31, as the fixed guide. According to the present invention, as the fixed guide may be used the track 32, the tangential line 33, and/or the like.

Further, the present embodiment of the parking assisting apparatus can display lines on the road such as, for example, the boundary line 91 of the parking place 90, as straight lines on the image displayed by the display device 12, and therefore, makes it easier for the vehicle driver to make judgments such as, for example, whether the lines on the image displayed by the display device 12 are parallel, in comparison with the case that the lines are displayed as distorted lines on the image displayed by the display device 12, resulting from the fact that the parking assisting apparatus is provided with the image converting unit 21. It is particularly effective that the present embodiment of the parking assisting apparatus is provided with the image converting unit 21 in the case that the present embodiment of the parking assisting apparatus employs as the fixed guide the tangential line 33 and/or tangential line 34, which are straight lines. It is needless to mention that the present embodiment of the parking assisting apparatus may not be provided with the image converting unit 21.

Figure 24:
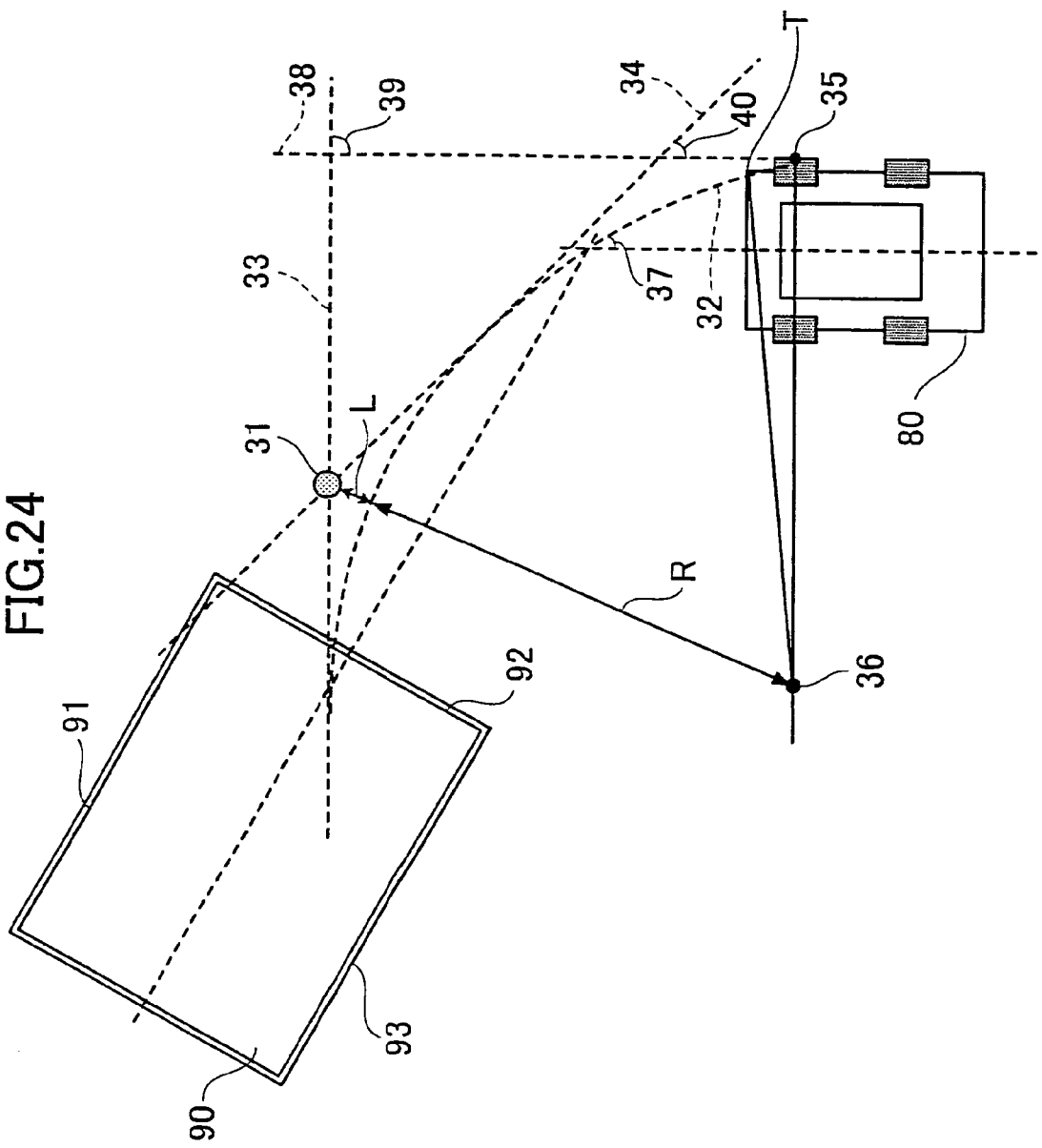
FIG. 24 is a view showing a relationship between the vehicle and the parking place when the vehicle driver starts parking the vehicle.

Further, while it has been described in the above described embodiments of the parking assisting apparatus about the fact that the fixed point 35 is a point on a line collinearly extending from a rear wheel axis forming part of the vehicle 80, spaced apart from a side portion forming part of the vehicle 80 at a constant distance, and located on the side opposite to the center 36 of a rotation of the vehicle 80 around which the vehicle 80 is expected to rotate while the vehicle 80 is driven backwardly at the maximum steering angle, with respect to the vehicle 80, but this does not limit the present invention. The same effect can still be obtained as long as the fixed point 35 is constituted by a point being constant in position with respect to the vehicle 80, and located on the side opposite to the center 36 of a rotation of the vehicle 80 around which the vehicle 80 is expected to rotate while the vehicle 80 is driven backwardly at the maximum steering angle, with respect to the vehicle 80. The fixed point 35 may be a point on a line collinearly extending from a rear wheel axis forming part of the vehicle 80 and located at a side portion forming part of the vehicle 80 opposite to and spaced apart at the maximum distance from the center 36 of a rotation of the vehicle 80 around which the vehicle is expected to rotate while the vehicle 80 is driven backwardly at the maximum steering angle, with respect to the vehicle 80, as shown in FIG. 24. This means that the fixed point 35 may be a point of the remotest side portion forming part of the vehicle 80, remotest from the center 36. In this case, the distance L between the track 32 and the steering start marker 31 becomes equal to a distance between the left side portion forming part of the vehicle 80 and the remoter boundary line 91 of the parking place 90 as shown in FIG. 25 when the vehicle 80 is parked. The parking assisting apparatus can effectively assist the vehicle driver in parking the vehicle 80 even though the vehicle 80 may be a large-size vehicle and the parking place 90 may have a small space if the distance L is, in advance, determined and stored in the parking assisting apparatus in consideration of the vehicle width of the vehicle 80 and the width of the parking place 90. In the concrete, the distance L may be determined to the degree that the left side rearmost portion T forming part of the vehicle 80, which is located on the side opposite to the center 36 of the rotation of the vehicle 80 around which the vehicle is expected to rotate while the vehicle 80 is driven backwardly at the maximum steering angle, with respect to the vehicle 80, will not get into touch with the boundary line 91 of the parking place 90 while the vehicle 80 is being parked, as shown in FIG. 24. In this case, the left side rearmost portion T forming part of the vehicle 80 corresponds to a bumper portion forming part of the vehicle 80, which is apt to get into touch with the left remoter boundary line 91 of the parking place 90 while the vehicle 80 is being parked in the parking place 90 located left backwardly from the vehicle 80. This leads to the fact that the parking assisting apparatus can effectively assist the vehicle driver in parking the vehicle 80 even though the vehicle 80 may be a large-size vehicle and the parking place 90 may have a small space. It is needless to mention that the distance L can be determined in consideration of the condition of the vehicle driver. The distance L may be determined, for example, shorter for the vehicle driver well experienced in driving while, on the other hand, the distance L may be determined longer for the vehicle driver with little experience in driving.

INDUSTRIAL APPLICABILITY OF THE PRESENT INVENTION

As will be seen from the foregoing description, the parking assisting apparatus according to the present invention has an effect of enabling a vehicle driver to drive a vehicle easier than ever before, and is available as a parking assisting apparatus for an automobile, and the like.

What is claimed is:

1. A parking assisting apparatus, comprising:
    image pickup means for picking up an image of an area behind a vehicle;
    display means for displaying said image picked up by said image pickup means; and
    image processing means for having said display means display a parking assisting guide for assisting a vehicle driver in parking said vehicle superposed on said image picked up by said image pickup means; and in which
    said parking assisting guide includes a steering start marker for notifying said vehicle driver of start of steering of said vehicle;
    said steering start marker is constituted by an intersection of tangential lines respectively tangent to a predetermined track at two different points;
    said predetermined track is a track expected to be drawn by a predetermined fixed point fixed with respect to said vehicle while said vehicle is driven backwardly at a maximum steering angle, and
    said fixed point is located on a side opposite to a center of a rotation of said vehicle while said vehicle is driven backwardly at a maximum steering angle, with respect to said vehicle.

2. A parking assisting apparatus as set forth in claim 1, in which
    said parking assisting guide includes a current steering angle track expected to be drawn by said predetermined fixed point while said vehicle is driven backwardly at a current steering angle.

3. A parking assisting apparatus as set forth in claim 1, in which
    said parking assisting guide includes a fixed guide fixed with respect to said steering start marker, and
    said fixed guide includes at least one of said predetermined track and said tangential lines, and displayed as being integral with said steering start marker.

4. A parking assisting apparatus as set forth in claim 3, in which
    said fixed guide includes at least one of said tangential lines respectively tangent at said two different points, and displayed as being integral with said steering start marker.

5. A parking assisting apparatus as set forth in any one of claim 1 through claim 4, in which said tangential lines tangent at said two different points are angled substantially at angles of 45 and 90 degrees with respect to said predetermined track expected to be drawn by said predetermined fixed point fixed with respect to said vehicle while said vehicle is driven backwardly at a maximum steering angle.

6. A parking assisting method, comprising the steps of:
    an image pickup step of picking up an image of an area behind a vehicle;
    a display step of displaying said image picked up in said image pickup step; and
    an image processing step of having said display step display a parking assisting guide for assisting a vehicle driver in parking said vehicle superposed on said image picked up in said image pickup step; and in which
    said parking assisting guide includes a steering start marker for notifying said vehicle driver of start of steering of said vehicle;
    said steering start marker is constituted by an intersection of tangential lines respectively tangent to a predetermined track at two different points;
    said predetermined track is a track expected to be drawn by a predetermined fixed point fixed with respect to said vehicle while said vehicle is driven backwardly at a maximum steering angle, and
    said fixed point is located on a side opposite to a center of a rotation of said vehicle while said vehicle is driven backwardly at a maximum steering angle with respect to said vehicle.

7. A parking assisting apparatus as set forth in claim 1, in which
    said fixed point is constituted by a point on a line collinearly extending from a rear wheel axis forming part of said vehicle, and located at a side portion forming part of said vehicle opposite to and spaced apart at a maximum distance from said center of said rotation of said vehicle with respect to said vehicle while said vehicle is driven backwardly at a maximum steering angle, with respect to said vehicle, and
    a distance between said predetermined track and said steering start marker is determined to the degree that the rearmost side portion forming part of said vehicle, which is located on a side opposite to said center of a rotation of said vehicle while said vehicle is driven backwardly at the maximum steering angle, with respect to said vehicle, is spaced apart at a predetermined distance from a remoter boundary line of a parking place.

* * * * *

UNITED STATES PATENT AND TRADEMARK OFFICE
CERTIFICATE OF CORRECTION

| | | |
|---|---|---|
| PATENT NO. | : 7,599,771 B2 | Page 1 of 1 |
| APPLICATION NO. | : 10/580791 | |
| DATED | : October 6, 2009 | |
| INVENTOR(S) | : Kazufumi Mizusawa | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 708 days.

Signed and Sealed this

Twenty-eighth Day of September, 2010

David J. Kappos
*Director of the United States Patent and Trademark Office*